DIGITAL PHASE EQUALIZER, AUTOMATICALLY OPERATIVE, IN ACCORDANCE WITH TIME-INVERTED IMPULSE RESPONSE OF THE TRANSMISSION CIRCUIT

Filed April 21, 1961 12 Sheets-Sheet 1

INVENTOR
J. P. RUNYON
BY
Charles Scott Phelan
ATTORNEY

INVENTOR
J. P. RUNYON
BY
Charles Scott Phelan
ATTORNEY

DIGITAL PHASE EQUALIZER, AUTOMATICALLY OPERATIVE, IN ACCORDANCE WITH TIME-INVERTED IMPULSE RESPONSE OF THE TRANSMISSION CIRCUIT

Filed April 21, 1961 12 Sheets-Sheet 3

INVENTOR
J. P. RUNYON
BY
Charles Scott Phelan
ATTORNEY

INVENTOR
J. P. RUNYON
BY
Charles Scott Phelan
ATTORNEY

INVENTOR
J. P. RUNYON
BY
Charles Scott Phelan
ATTORNEY

INVENTOR
J. P. RUNYON
BY
Charles Scott Phelan
ATTORNEY

Jan. 1, 1963 J. P. RUNYON 3,071,739

DIGITAL PHASE EQUALIZER, AUTOMATICALLY OPERATIVE, IN ACCORDANCE WITH TIME-INVERTED IMPULSE RESPONSE OF THE TRANSMISSION CIRCUIT

Filed April 21, 1961 12 Sheets-Sheet 7

INVENTOR
J. P. RUNYON
BY
Charles Scott Phelan
ATTORNEY

INVENTOR
J. P. RUNYON
BY
Charles Scott Phelan
ATTORNEY

INVENTOR
J. P. RUNYON
BY
Charles Scott Phelan
ATTORNEY

INVENTOR
J. P. RUNYON
BY Charles Scott Phelan
ATTORNEY

INVENTOR
J. P. RUNYON
BY
Charles Scott Phelan
ATTORNEY

Jan. 1, 1963 J. P. RUNYON 3,071,739
DIGITAL PHASE EQUALIZER, AUTOMATICALLY OPERATIVE, IN
ACCORDANCE WITH TIME-INVERTED IMPULSE RESPONSE
OF THE TRANSMISSION CIRCUIT
Filed April 21, 1961 12 Sheets-Sheet 12

FIG. 15A
ORIGINAL STANDARD IMPULSE

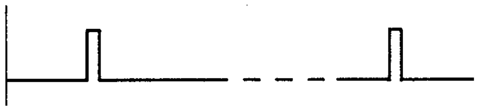

FIG. 15B
RECEIVED STANDARD IMPULSE

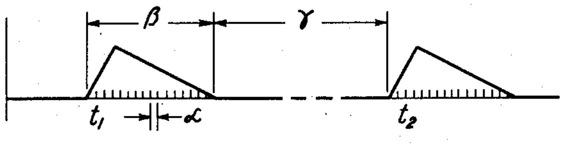

FIG. 15C
MATCHER 60 OUTPUT

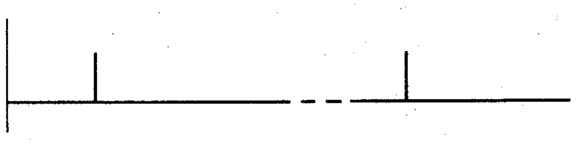

FIG. 15D
LOOP ADDRESS

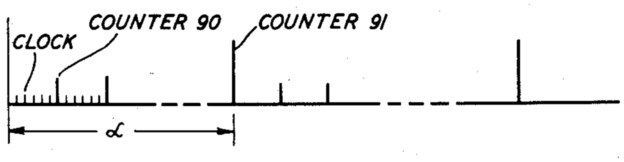

FIG. 15E
SIGNAL RESPONSIVE COUNTERS

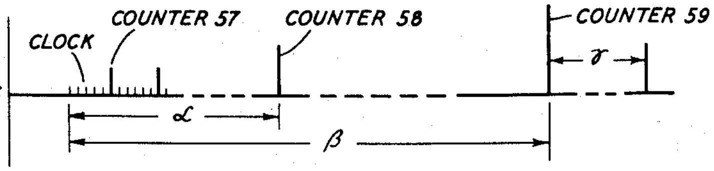

FIG. 15F
ARITHMETIC CONTROL PULSES ON 4th SAMPLE AT SAMPLE LOCATION $t_i$

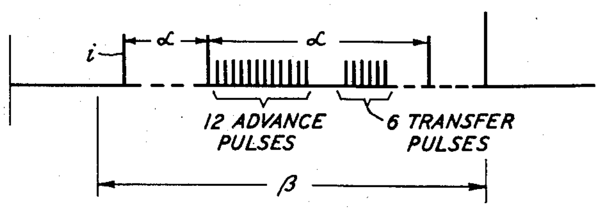

INVENTOR
J. P. RUNYON
BY
Charles Scott Phelan
ATTORNEY

United States Patent Office 3,071,739

Patented Jan. 1, 1963

3,071,739

DIGITAL PHASE EQUALIZER, AUTOMATICALLY OPERATIVE, IN ACCORDANCE WITH TIME-INVERTED IMPULSE RESPONSE OF THE TRANSMISSION CIRCUIT

John P. Runyon, Mendham, N.J., assignor to Bell Telephone Laboratories, Incorporated, New York, N.Y., a corporation of New York Filed Apr. 21, 1961, Ser. No. 104,666

40 Claims. (Cl. 333—18)

This invention relates to an automatic phase equalizer. It relates particularly to such an equalizer which is characterized by digital operation and which may be employed at the receiving end of a transmission system for correcting delay distortion.

There are a number of known prior art circuits of the active type in which a complementary corrective signal is applied to a distorted signal in order to reduce delay distortion. The actual use of such circuits is restricted, however, by practical considerations. For example, it is inconvenient to adapt some correcting equipment to different transmission systems. In other active equalizers the correcting circuits depend for operation on a specialized circuit element, such as a finely tapped delay line, or analog multiplying devices, which are extremely difficult to manufacture and use.

In digital transmission systems, attempts have been made to reduce the effects of delay distortion by a variety of approaches which side-step the use of equalizers. One approach is to regenerate the digital signal at frequent intervals by employing a slicer to detect marks and spaces and drive a suitable pulse generator. Other approaches involve frequency-shift systems or phase changing systems which are designed to be relatively insensitive to delay distortion. However, each of these prior approaches is primarily useful for digital signals only.

It is, therefore, an object of the present invention to correct delay distortion in transmitted signals by means of a practical, active circuit employing reliable circuit devices.

It is another object of the invention to correct delay distortion in a digital signal by employing an active circuit in an arrangement which may be readily adapted for use in connection with different transmission systems.

A further object of the invention is to employ digital techniques in an automatic phase equalizer for either digital or continuous signals.

These and other objects of the invention are realized in an illustrative embodiment thereof in which samples of a phase-distorted signal are extracted at the receiving end of a transmission system which is to be equalized. The sample magnitudes are encoded in a binary code and operated upon by a first plurality of stored binary words representing the time-reversed impulse response of the transmission system. An accumulator having a different plurality of word storage positions totals the modified magnitudes of all samples continuously on a real-time basis. The content of an accumulator word position is read out at the signal sampling rate, and a digital-to-analog decoder receives the accumulator output and produces the phase-equalized signal.

Circuits are also provided for adjusting received signal amplitude, for determining and storing in digital form the transmission system impulse response, and for automatically operating the equalizer through its three modes of operation, i.e., adjusting amplitude, determining response, and equalizing.

A complete understanding of the invention to enable one skilled in the art to construct and operate the same may be obtained from a consideration of the following descriptive portions of the specification taken together with the appended claims and the attached drawings in which:

FIG. 15 includes timing diagrams illustrating the timing control of the invention in two of its modes of operation.

In any electric signal transmission system, and particularly in digital systems designed for data transmission, a signal impulse is included in a finite time interval $t$ in its transmitted form. During transmission each element of the impulse is subjected in sequence to the various system factors contributing to a certain impulse response for the system. These factors affect the different frequency components in the impulse in different ways. That is to say, some frequency components are attenuated more than others, and some are delayed more than others. This invention is concerned with the differential delay aspect which causes the received signal impulse to occupy a larger time slot than the transmitted impulse so that each received impulse occupies a time interval $t+\Delta t$ units of time.

Theoretically, the desirable way to correct delay distortion would be to pass the received signal through one of the proverbial "black boxes" with a phase transmission characteristic which is the inverse of the system phase transmission characteristic so that each frequency component may have a total transmission time through the transmission system and through the black box which is exactly the same as the total transmission time of all other frequency components. In other words, the phase-equalized signal impulse in the output of the black box will have a duration of $t$ units of time.

The present invention is directed to such a delay-correcting black box. The underlying principle of the invention is that one can approach the ideal situation, wherein delayed frequency components are pushed back into their original relative positions, by operating upon impulse elemental amplitudes in such a way as to simulate time-reversed retransmission through the same transmission system and by then combining the modified samples on a real-time basis. The invention is applicable to the equalization of both continuously varying and pulsed signals. However, the subsequent description is cast in terms of a pulsed, or digital, signal since that approach seems to facilitate a conceptual understanding of the invention.

Figure 1:
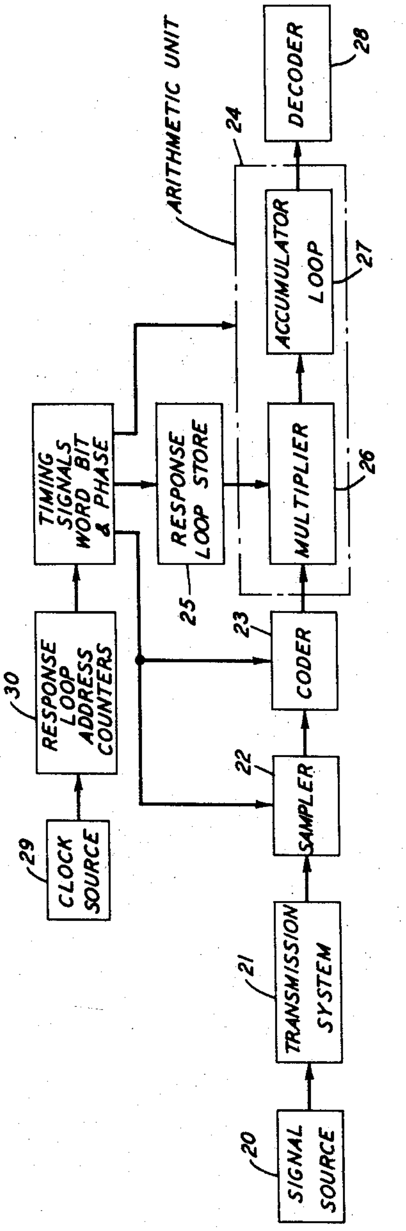
FIG. 1 is a simplified block and line diagram illustrating the invention in its equalizing mode of operation.

In carrying out the invention, standard impulse signals from a source 20 in FIG. 1 are transmitted over a system 21 which is to be equalized. A sampler 22, a coder 23, and an arithmetic unit 24 determine the average standard impulse amplitudes at $n$ sample locations in the received impulse. All of these averages together comprise the impulse response of system 21 and are stored in time-reversed, serial, binary-word form in a recirculating delay loop designated response loop store 25. Stored words are circulated through one complete trip around the loop store 25 during the signal sampling interval. Thus, if the $n$ signal impulse samples occur at a rate of $f$ samples per second each stored word circulates once through loop store 25 in $$\frac{1}{f}$$

seconds.

After the impulse response of system 21 has been determined and stored, source 20 is modified to produce information signals, which may be either continuous or digital, instead of standard impulses. These signals, after transmission over the system 21, are applied to the black box which constitutes the present invention. Signals are sampled periodically by sampler 22 at intervals of $$\frac{1}{f}$$

seconds, and each sample magnitude is converted by coder 23 into a multidigit binary word wherein the presence or absence of pulses, ONES or ZEROS, in a certain pattern represents the sample magnitude in a binary code form. Each digit of the word is called a "bit." $m-1$ of the bits include sample magnitude information per se, and the remaining bit indicates the sign of the magnitude.

A multiplier 26 in arithmetic unit 24 multiplies each of the $n$ sample magnitudes by all of the $n$ stored loop words which are read out of loop store 25 in time-reversed word order with respect to the time of reception of corresponding sample locations in a standard distorted impulse. Thus, there are produced, for each individual signal sample, $n$ new product words which represent together the amplitude effect that might be produced on the sample by passing such sample through the transmission system a second time in a time-reversed manner, i.e., sample trailing edge first.

The $n$ new product words for each signal sample are then entered serially in an accumulator loop 27 which has one more word position than does the response loop store 25. Thus, while the information in response loop 25 circulates once in each $$\frac{1}{f}$$

seconds, the information in accumulator loop 27 circulates once in each $$\frac{n'}{fn}$$

seconds where $n'$ is the number of storage positions in loop 27. The effect of the extra word position is to add each series of $n$ new product words to the previously accumulated total so that each new word product series is left-shifted one word position with respect to the previously accumulated total before being added thereto. The accumulated total in each word position represents the summation of one product word for a given sample plus one product word of the impulse response portions of each other sample overlapping the given sample when considered on a real-time basis. In other words, the $n$ product words for each signal sample occupy much more than the original sampling interval when considered serially on a bit-by-bit, or real-time, basis. Accordingly, some product words of one sample overlap those of another sample; and the accumulator is adapted to take these overlaps into account, i.e., it combines on a real-time basis.

By extracting the contents of one accumulator word position for each sample taken, a single binary word is obtained for each sample, and the latter word represents a summation of the products from $n$ adjacent samples having impulse response intervals overlapping such sample time. If the sampling frequency is at least equal to twice the bandwidth of the signal, the samples may be employed to reproduce the sampled signal accurately, as is well known in the art.

Figure 2:
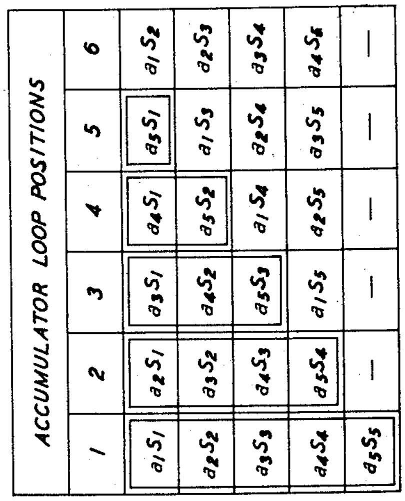
FIG. 2 is a table illustrating the operation of one type of accumulator that may be employed in the invention.

A table is provided in FIG. 2 to demonstrate the previously-described accumulator operation for a five-position storage loop and a six-position accumulator loop. Stored impulse response words are represented by $a_i$, and signal sample words are represented by $s_i$. It can be seen from FIG. 2 that the loop store includes five impulse response words $a_1, a_2 \ldots$ and $a_5$. The signal is sampled periodically to generate samples $s_1, s_2 \ldots s_n$. Readout is accomplished from the accumulator loop after the accumulation of the $a_5s_i$ product for each sample $s_i$ even though the loop has six storage positions.

In order to facilitate the illustration of the concept involved, it is assumed with respect to FIG. 2 that a single transmitted standard pulse is involved and that this pulse is sampled five times. Thus, before $s_1$ all signal samples are zero and after sample $s_5$ all signal samples are zero. Each accumulator readout after the storage of an $a_5s_i$ product includes the summation of all products previously stored in the same word position with that product since the last readout. These summed products are of the form of $a_1s_{i-4}$, $a_2s_{i-3}$, $a_3s_{i-2} \ldots a_5s_i$. In FIG. 2 the first sum readout includes only one product $a_5s_i$ because the received signal was zero before the pulse including sample $s_1$ arrived at the receiver. Each subsequent sum readout includes an additional product, as illustrated by the enclosed products in each FIG. 2 accumulator position column, until the $a_5s_5$ product position is read out. After the $a_5s_5$ position has been read out, each of the following summations includes one less product until no further information remains in the accumulator. The latter summations are not enclosed in FIG. 2, but the non-zero products are shown and would be read out from accumulator loop positions 6, 5, 4, and 3 in that order following the readout from loop position 1.

The operation of the accumulator with reference to FIG. 2 may be further illustrated by a simplified numerical example. Continuing the original assumption of a single standard pulse, let us further assume that system 21 is of such character that the response words in loop store 25 equal the signal sample words, that is $a_i=s_i$. Then the following typical sample values may be taken:

$$s_1=a_1=0.2$$
$$s_2=a_2=1.0$$
$$s_3=a_3=0.4$$
$$s_4=a_4=0.2$$
$$s_5=a_5=0.1$$

Figures 3, 4A, 4B:
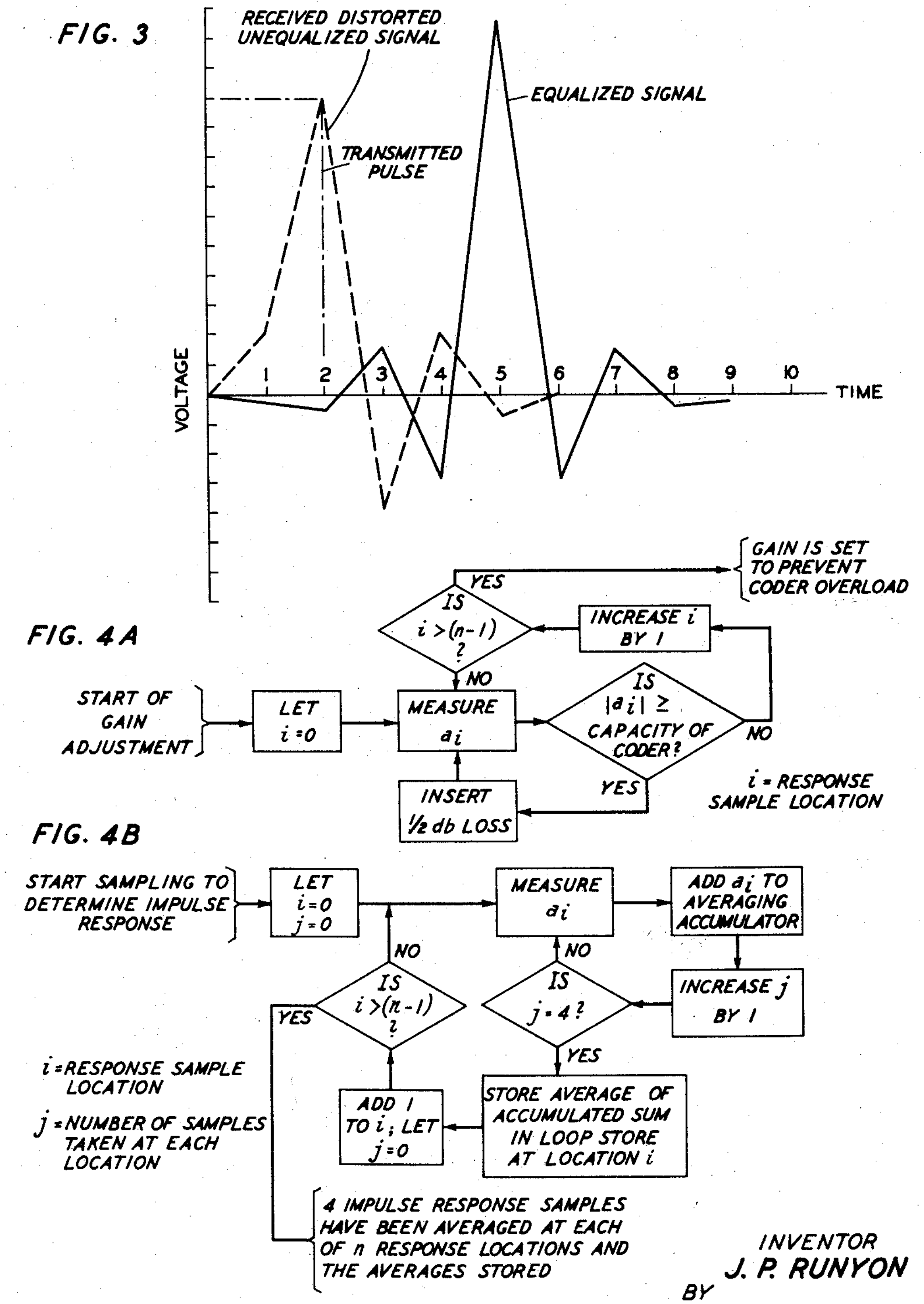
FIG. 3 is a voltage wave diagram illustrating the operation of the invention.
FIGS. 4A and 4B are logical process diagrams explaining certain aspects of the invention.

If all products shown in FIG. 2 are determined, and the summations of the five enclosed portions of FIG. 2 as well as the remaining four unenclosed portions are performed, the resulting nine equalized signal values may be plotted against a time scale as shown in the solid-line diagram of FIG. 3. The plotting sequence with respect to time would, of course, reflect the order in which the accumulated summations become available, namely accumulator positions 5, 4, 3, 2, 1, 6, 5, 4, and 3 in that order.

FIG. 3 includes comparative diagrams showing with exaggerated simplicity a transmitted pulse, the resulting signal received with delay distortion, and the received signal after phase equalization. The sampling rate for the illustration is about one-sixth of the Nyquist rate so the picture is rather crude, but it is designed primarily to illustrate accumulator operation. No attempt is made to show phase relationships among the three diagrams, but for the sake of convenience they are all started at a common initial point on the time scale.

One significant thing that can be observed in FIG. 3 is that the phase-equalized diagram shows a principal peak of enlarged amplitude and reduced width with respect to the received principal peak while lesser peaks in the symmetrical skirts of the equalized signal have reduced amplitude as compared to the single skirt of the received distorted signal. Thus, the improvement is apparent in the crude diagrams of FIG. 3. The improvement becomes even more dramatic when the signals are sampled at a minimum frequency corresponding to the Nyquist rate.

Another significant feature of the FIG. 3 diagram is that the principal peak of the equalized signal is centrally located time-wise with respect to its skirt portions.

Referring once again to FIG. 1, accumulated words are coupled from loop 27 to a decoder 28 which produces an equalized signal impulse in response to the accumulated product word from loop 27. Thus, signals are phase equalized by sampling, encoding the sample magnitudes in a binary system, operating on the binary sample magnitude words with the time-reversed impulse response of the system through which the words have just passed, and decoding the modified binary words to reconstruct the signal in equalized form.

Coordinated operation of all parts of the automatic phase equalizer of the invention is accomplished by providing a source 29 of clock signals which may drive response loop address counters 30. Cyclically recurring timing signals at the various required rates are extracted from appropriate stages of counters 30 in a well-known manner for shifting information in loop store 25 and for operating other parts of the equalizer in co-operation with loop store 25.

Figure 5:
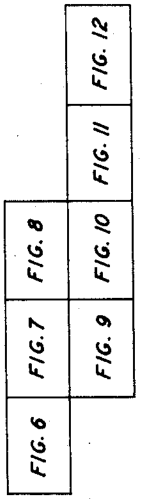
FIG. 5 is a diagram showing the manner in which FIGS. 6 through 12 should be combined to produce a block and line diagram showing the essential details of an entire equalizer in accordance with the invention.

The invention also includes additional circuits, to be described in connection with the FIGS. 6 through 12, for automatically making preliminary adjustments to the phase equalizer system and for determining and storing in loop store 25 the words representing impulse response of the system to be equalized. The co-operative arrangement and operation of these additional circuits, as well as the details of the circuits mentioned in connection with FIG. 1, may be perceived most readily if FIGS. 6 through 12 are assembled in the manner indicated in FIG. 5.

Figure 9:
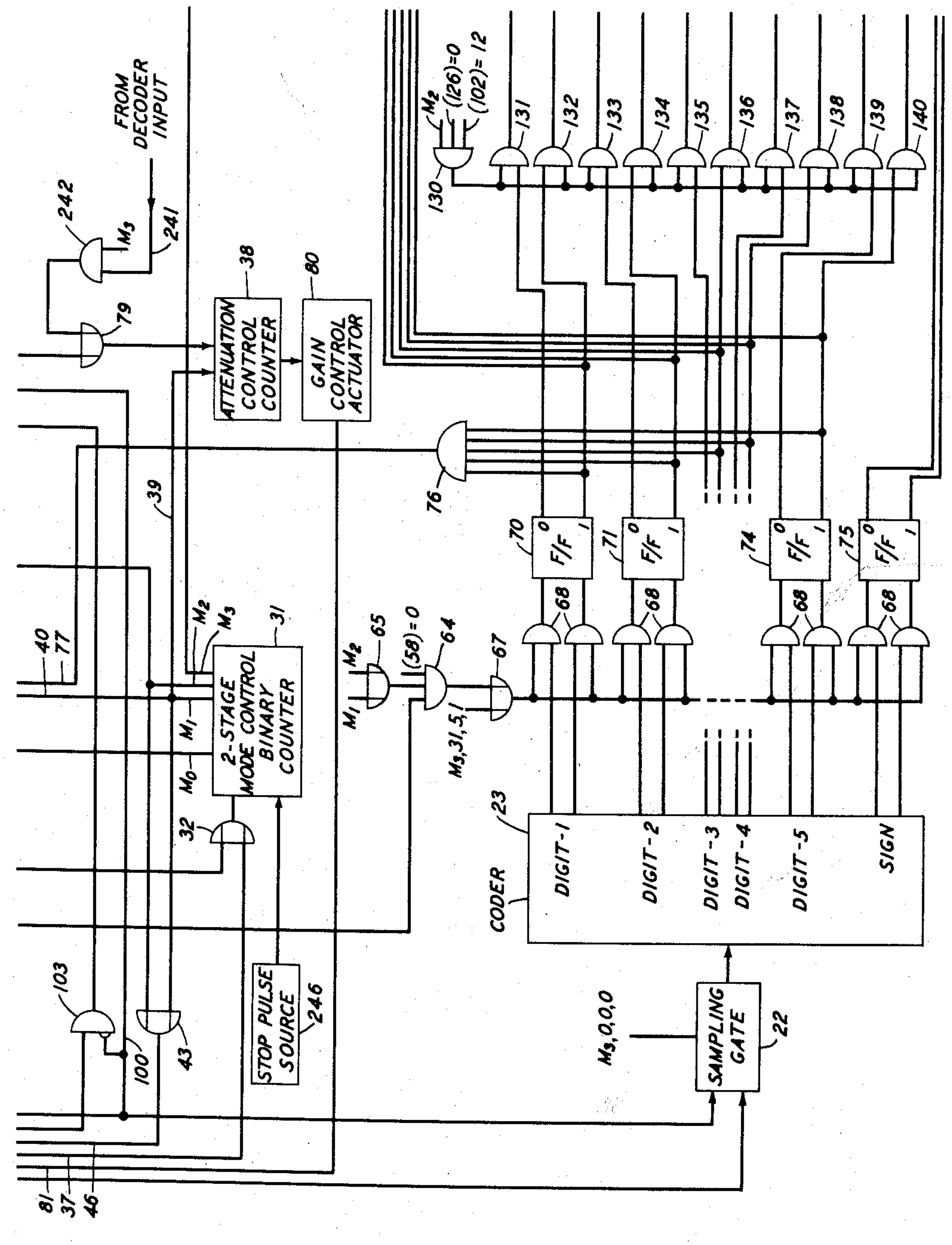

A mode control counter 31 in FIG. 9 is the heart of the automatic sequencing of various equalizer operations. These operations are (*a*) set input signal level; (*b*) determine and store in loop store 25 the impulse response of the system to be equalized; and (*c*) equalize information signals. FIGS. 4A and 4B are logical process diagrams illustrating the functions which take place during each of the mentioned (*a*) and (*b*) modes, respectively. In FIG. 4A a signal sample at each sample location $i$ is measured in terms of coder capacity. Loss is added in one-half-decibel steps until the sample has a magnitude which is less than coder capacity. Other sample locations are similarly tested and loss added as required until all locations in a typical impulse response interval have been checked. Then it is known that no signals that are likely to be received will overload the coder.

In FIG. 4B the object is to determine and store in loop store 25 the response of system 21 to a typical impulse. Samples are taken at each of the sample locations $i$, and the sample magnitudes are measured, or encoded, and then accumulated. When four samples have been taken at a location, the average magnitude is stored at the proper location in loop store 25; and a command given to examine the next response sample location in a similar manner. An indication is given after response has been determined at all $n$ of the response locations.

Counter 31 in FIG. 9 is a two-stage binary counter having four output leads indicating each of four successive counts of 0, 1, 2, and 3. For example, counter 31 may include two cascaded flip-flop circuits with the various translating device outputs connected through logic gates to the output leads $M_0$, $M_1$, $M_2$, and $M_3$ so that each of these output leads is activated for only one of the four counts. This is a well-known technique requiring no further description and is used throughout this specification when referring to a counter having a certain full count capacity with one or more outputs to be activated for less than a full count.

Counter 31 is advanced by impulses received through an OR gate 32. Output leads $M_0$ through $M_3$ are connected to various gates throughout the equalizing circuit for controlling different connections of the basic equalizer components. Actual connecting leads to these gates are shown for only a few examples, and in other cases input leads to logic gates that are connected to counter 31 are simply designated with the reference character of the counter lead to which they are connected. In order to prevent unnecessary complication of the drawing, and to permit the underlying principles of the invention to be clearly shown, only the most important logic gates needed for the basic operations of the illustrated embodiment are shown. Other gates might be used for certain embodiments to enable or disable certain circuit paths, but such refinements will be obvious to those skilled in the art, and no attempt has been made to show them.

*Gain Setting Mode*

Operation of the automatic phase equalizer is initiated by making preliminary adjustments so that none of the received signals will be likely to overload coder 23 or any other part of the circuit.

Figure 6:
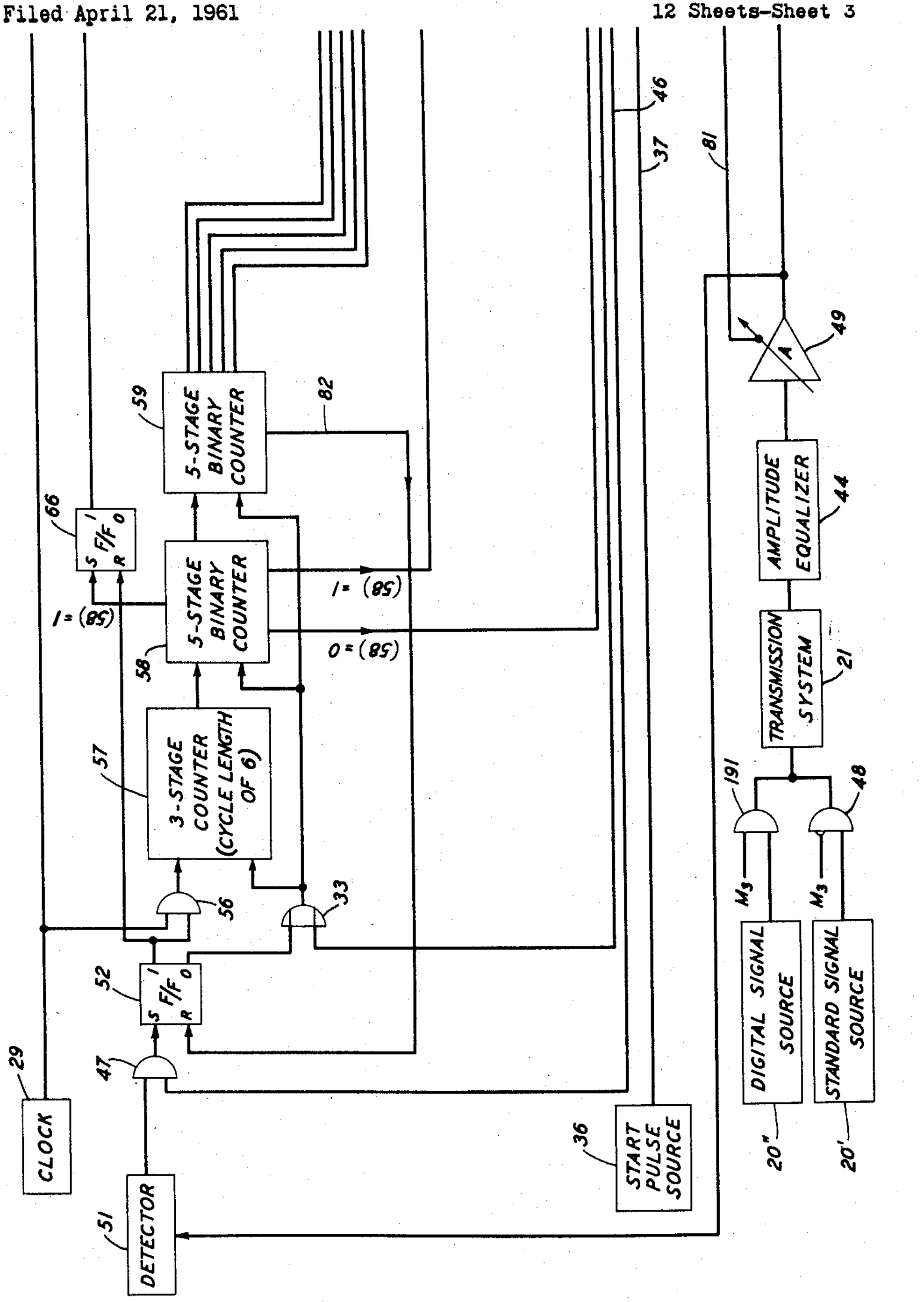

In the quiescent condition of the equalizer, lead $M_0$ of counter 31 is activated and applies a reset signal through an OR gate 33 to signal response counters in FIG. 6 to be described. A start pulse from a source 36 in FIG. 6 is coupled by a lead 37 and OR gate 32 to mode control counter 31 in FIG. 9. This pulse advances counter 31 to activate lead $M_1$ and to deactivate all other output leads thereof. An attenuation control counter 38 is conditioned for operation by the $M_1$ lead signal applied over lead 39. A lead 40 extends this same mode control signal from counter 31 to an enabling input of an AND gate 41 in the input of a sample address counter 42 shown in FIG. 7. The $M_1$ output is also coupled through an OR gate 43 in FIG. 9 over a lead 46 to enable a gate 47 in FIG. 6.

Standard pulses, shown in FIG. 15A, are generated by a source 20'; and, after transmission through a gate 48 and system 21, they appear at the output of system 21 with both phase and amplitude distortion as shown in FIG. 15B. An amplitude equalizer 44 corrects for differential attenuation of the signal frequency components in a well-known manner. The received impulses are then coupled through an amplifier 49 to sampling gate 22 in FIG. 9 and to a detector 51 in FIG. 6.

Detector 51 may be any suitable circuit, such as a blocking oscillator, which responds when the amplifier output voltage crosses a predetermined threshold, and develops a pulse of sufficient amplitude to operate the various circuits following it. The output of detector 51 passes through the gate 47 to the set input of a flip-flop circuit 52. After a time interval of sufficient length to assure triggering of flip-flop 52, detector 51 resets itself.

Flip-flop 52 actuates a gate 56 to couple raw clock pulses from clock source 29 to a three-stage counter 57 which is the first of three signal responsive counters. Flip-flop 52 also resets a flip-flop circuit 66 to be further described. Counter 57 is arranged to recycle after every sixth clock pulse and to advance the next signal responsive counter 58 each time it recycles. Counter 58 in turn drives a further signal responsive counter 59, and the output of the latter is compared by a matching logic circuit 60 with the output of the sample address counter 42. Counters 42, 58, and 59 are conventional five-stage binary counters which recycle on a count of 32. If the outputs of all stages of signal responsive counter 59 are matched with the outputs of corresponding stages of sample address counter 42, the matching circuit 60 produces an output pulse to an AND gate 61. When gate 61 is further enabled in a manner to be described, the matcher pulse is transmitted to the input of sampling gate 22 in FIG. 9, and gate 22 passes a sample of the signal in the output of amplifier 49 to the binary coder 23.

Figure 7:
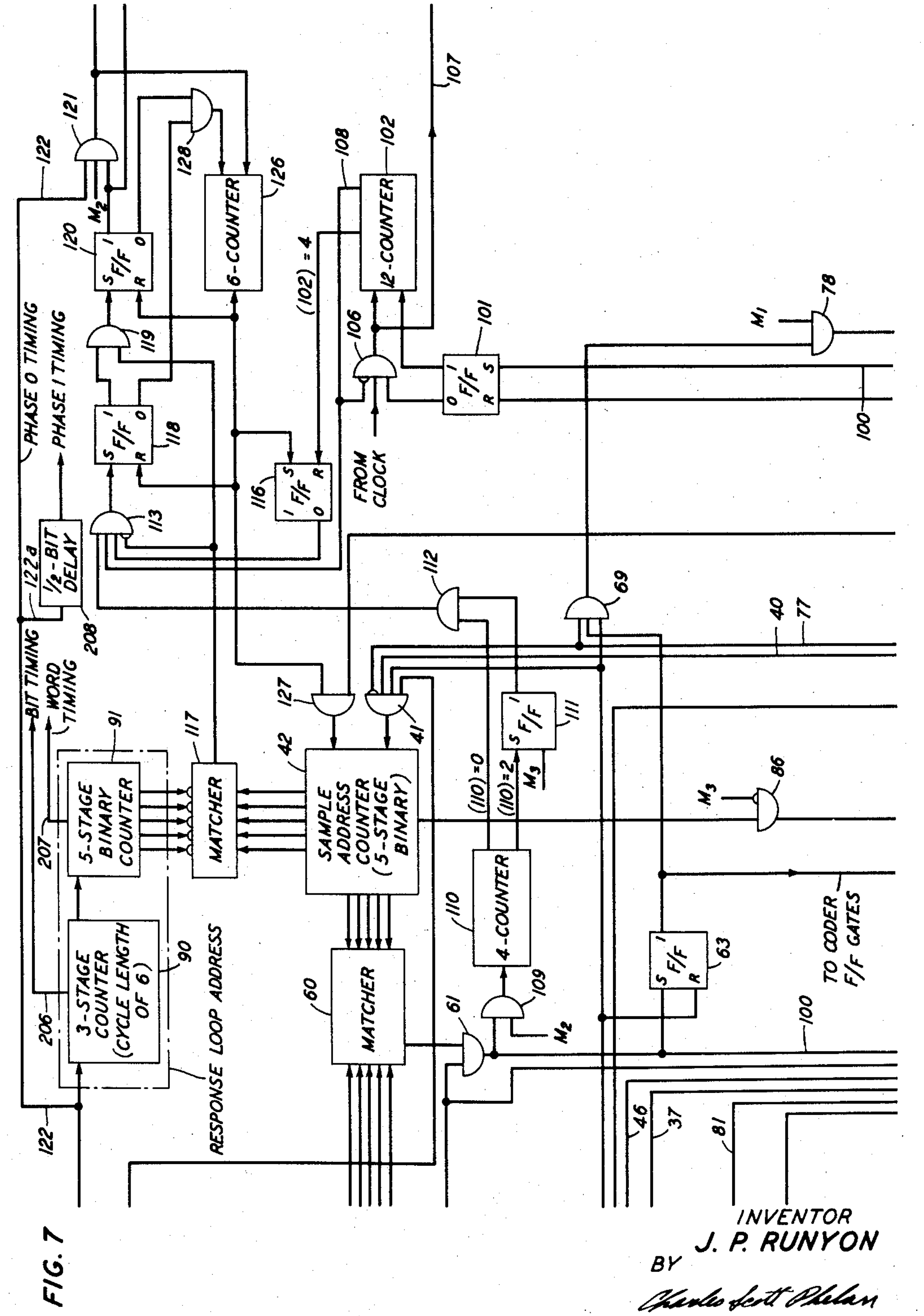

When counter 58 is in its zero count condition its output on lead (58)=0 tends to enable gates 41 and 69 in FIG. 7. As the counting of pulses from clock source 29 proceeds, counter 58 is advanced and removes the mentioned enablements. When counter 58 passes through a condition representing an intermediate count such as the count of one, it provides an output on a lead (58)=1 to set flip-flop 66 in FIG. 6 for partially enabling gate 41 in the input of sample address counter 42 in FIG. 7. Counter 58 also provides a similar output on another lead (58)=1 to enable gate 61 for coupling the matcher 60 output pulse to sampling gate 22, but this enabling signal is removed as soon as counter 58 advances beyond the one count. Eventually matcher 60 recognizes a condition in which the outputs from counters 42 and 59 are matched. At this time it produces an output partially enabling gate 61 as before mentioned.

Counters 57 and 58 recycle. When counter 58 reaches its one count condition again, it provides the final enablement needed to actuate gate 61 which in turn signals sampling gate 22 to obtain a sample of a standard pulse at the impulse response location indicated by time $t_1$ in FIG. 15B. Impulse response depicted in FIG. 15B is quite different from that in FIG. 3 because the reduced size of FIG. 15B makes it convenient to show only the approximate response envelope. The output from gate 61 also sets a flip-flop circuit 63 in FIG. 7 partially to enable gate 69. The ONE ooutput from flip-flop 63 also partially enables an AND gate 64 in FIG. 9. Gate 64 is further partially enabled by the $M_1$ lead output from mode control counter 31 supplied through an OR gate 65. These gates 64 and 65 co-operate upon the occurrence of the next zero count in counter 58 to supply a timing signal through a further OR gate 67 for enabling timing gates 68 in the inputs of flip-flops 70 through 75.

Signal samples supplied from sampling gate 22 to coder 23 cause the coder to produce a six-digit binary word in parallel form to represent the magnitude and sign of each signal sample received from gate 22. Digits −1 through −5 are magnitude digits and the sixth digit contains sign information. These coder outputs are applied through the aforementioned timing gates 68 to set appropriate ones of the coder output flip-flop circuits 70 through 75. The magnitude digits represented in the ONE outputs of flip-flops 70 through 74 are coupled to separate input connections of an AND gate 76. Referring now momentarily to FIG. 4A, the question of whether or not a sample magnitude is at least equal to the capacity of coder 23 is asked by gate 76.

Coder 23 may take the form of any of the well known voltage-input analog-digital converters. In an application suitable for telephone systems, a coder which is capable of representing 32 amplitude gradations would be satisfactory. Two-rail connections are provided between each output of coder 23 and the respective flip-flop circuits 70 through 75 so that these flip-flops are positively controlled by either a ONE or a ZERO in a corresponding coder output, digit position.

If a sample magnitude is at least equal to the maximum magnitude which coder 23 can represent accurately with its binary coded magnitude outputs, all five of the flip-flops 70 through 74 are actuated to their ONE condition. Gate 76 is thereby enabled and a pulse is coupled from gate 76 by lead 77 to the inhibit input of gate 41 in FIG. 5. As long as gate 76 is operated, the sample address counter 42 is unable to advance even though the three enabling inputs of gate 41 may be activated. The same signal on lead 77 also supplies further enablement to gate 69 which was previously partially enabled by the ONE output of flip-flop 63.

Counter 58 continues to advance until it is full and causes counter 59 to be advanced one step thereby removing the matched output condition with respect to address counter 42. When counter 58 recycles, its zero count fully enables gate 69 to pulse the attenuation control counter 38 in FIG. 9 through an AND gate 78 and an OR gate 79. The same zero count signal from counter 58 simultaneously resets flip-flop 63 to disable gate 69. Since the set output of flip-flop 63 is required for fully enabling gate 69, the reset input of flip-flop 63 may be arranged to operate on the trailing edge of the zero count signal from counter 58 to avoid a race condition in the operation of the flip-flop 63. This is a well-known design technique in digital circuits.

The operation of attenuation control counter 38 in FIG. 9 actuates a gain control actuator 80 which supplies a signal through a lead 81 to adjust the gain of the input amplifier 49 in FIG. 6 in one-half-decibel steps. Counter 38 and actuator 80 may be, for example, a counter and a diode switching arrangement wherein diodes are biased ON or OFF by different counter outputs for electronically coupling different amounts of resistance in the circuit of amplifier 49 in a manner which is well known in the art.

Signal responsive counters 57, 58, and 59 continue counting until counter 59 is full and applies a signal on a lead 82 to reset flip-flop 52. This action disables gate 56 to stop the counting operation and applies a reset signal to the counters through gate 33. A new standard pulse from source 20′ starts the counting of clock pulses once more, and counting continues until a matching condition occurs at the same impulse response location $t_1$ for the new cycle. An additional one-half decibel of loss is inserted in the circuit of amplifier 49 during each recycling operation at location $t_1$ as long as signal sample magnitudes are at least equal to the capacity of coder 23.

When sufficient loss has been inserted so that a sample magnitude is unable to cause coder 23 to actuate all of the flip-flops 70 through 74 the circuit operation changes somewhat. Upon the encoding of the magnitude of such a sample, a zero count on the next recycling of counter 58 activates timing gates 68 and causes at least one of the flip-flops 70 through 74 to be reset to its ZERO condition. This particular zero count condition of counter 58 also simultaneously operates gate 69 in FIG. 7, as previously described, to add an additional one-half decibel of loss in the circuit of amplifier 49, and it resets flip-flop 63 in FIG. 7. Gate 76 is now disabled since at least one of the coder flip-flops 70 through 74 is in its ZERO condition. Accordingly, the inhibition signal is now removed from gate 41 in FIG. 7. Upon the next recycling of counter 58, its zero count condition adds the final enabling input to gate 41; and since there is no inhibiting input, gate 41 operates to advance sample address counter 42 for testing the next sample location time $t_2$ in the impulse response of FIG. 15B.

The entire sampling and coder output testing operation is again repeated for sampling location time $t_2$ and for all remaining sampling locations in the impulse response as previously outlined in connection with FIG. 4A. Upon completion of the testing of all impulse response sampling locations, the gain of amplifier 49 has been adjusted to a point such that none of the samples in a train of standard signal source impulses can produce a full coder output. It is then certain that none of these samples will overload coder 23. When the last of $n$ sample locations, in this case $n$ is equal to 32, has been so tested, sample address counter 42 spills over and produces a pulse which is coupled through an AND gate 86 and OR gate 32 to advance the mode control counter 31 in FIG. 7. Such advance indicates that the gain setting mode of operation has been completed and the averaging mode may begin.

*Averaging Mode*

Output lead $M_2$ of mode control counter 31 is now actuated, and signal is removed from the other output leads of the counter. The signal on lead $M_2$ operates the necessary gates for revising circuit connections to place the sample address counter 42 under the control of arithmetic unit control circuits, to be described, so that the equalizer operates in accordance with the logical process diagram of FIG. 4B. In this mode of operation, counter 42 may not be advanced until an average amplitude has been computed and stored for a certain impulse response sampling location. It is no longer possible to advance counter 42 by a pulse applied through gate 41 since the enabling input to gate 41 from the $M_1$ lead of mode control counter 31 has been removed.

Signal samples are selected by the co-operation of signal responsive counters 57 through 59, sample address counter 42, and matcher 60 in much the same manner previously described for the gain setting mode of operation. Pulses from the output of matcher 60 initiate the production of two sets of specialized timing pulses for controlling the averaging operation.

The first set of control pulses to be described is a series designated "twelve advance pulses." In order to produce these, a lead 100 couples pulses from gate 61 in the output of matcher 60 to the set input of a flip-flop circuit 101 in FIG. 7. The ONE output of this flip-flop resets a twelve-counter 102 to zero if it had previously attained some other count level.

Upon the occurrence of a one count in signal responsive counter 58 of FIG. 6, a gate 103 in FIG. 9 is enabled. If there is no inhibiting input to this gate from lead 100, the output of gate 103 resets flip-flop 101 thereby enabling a gate 106 in FIG. 7; and the latter gate couples raw clock pulses to the input of counter 102. These same pulses are also applied by a lead 107 to the arithmetic unit 24. After counter 102 has recognized twelve such clock pulses, that is, the twelve advance pulses, it causes a voltage to be coupled by a lead 108 to the inhibit input of gate 106 thereby cutting off its supply of clock pulses from gate 106.

The second group of control pulses for the averaging operation is a series designated "six transfer pulses." The circuits for producing this series of pulses are shown in FIG. 7 and co-operate with the response loop address counters 90 and 91 and with the twelve-counter 102 in order to produce the six transfer pulses at the correct time with respect to the operation of the remainder of the equalizer.

Output pulses from matcher 60 are coupled through gate 61 to activate a control gate 109 which had previously been enabled by the $M_2$ output from mode control counter 31. These matching pulses correspond, of course, with the control pulses previously described for operating sampling gate 22, and they are counted by a four-counter 110. When counter 110 reaches the count of two, a signal is applied by an output lead designated (110)=2 to a flip-flop circuit 111, and the set output of this flip-flop enables an AND gate 112. When four matching pulses have been counted counter 110 recycles and applies a signal over its output lead designated (110)=0 to activate gate 112 and apply a voltage to one of the enabling input connections of a gate 113.

A second enabling input to gate 113 is supplied from the lead 108 of the twelve-counter 102 when that counter reaches the count of twelve.

A third enabling input for gate 113 is supplied from the reset output of a flip-flop circuit 116 which may be reset by an intermediate count, e.g., four, from counter 102 over a lead designated (102)=4.

Gate 113 also has an inhibiting input which is coupled from the output of an additional counting circuit matcher 117 which compares the patterns of activity in sample address counter 42 with those in loop address counter 91. It will be observed in FIG. 7 that the input connections to matcher 117 from counter 91 are completed through inhibiting, or inverting, inputs. This type of input is employed to cause a time reversal of stored impulse response signals with respect to incoming signals as will become evident in the subsequent description of the equalizing mode of operation. Now in the absence of a matched condition in matcher 117, at the same time that counter 110 has counted four matcher pulses from matcher 60, and counter 102 has completed at least one cycle of counting a burst of twelve pulses, gate 113 is fully enabled and applies a set signal to a flip-flop circuit 118. This flip-flop enables a gate 119 which is actuated in response to the next matching pulse from matcher 117 to set an additional flip-flop 120. An additional gate 121 is partially enabled by the set output from flip-flop 120 and further partially enabled by the $M_2$ output from mode control counter 31 so that raw clock pulses from a lead 122 may be passed to a lead 123 in FIG. 8. Lead 123 supplies these clock pulses to arithmetic unit 24.

A six-counter 126 also receives the output of gate 121 and when six clock pulses have been counted the counter 126 sets flip-flop circuit 116 and resets flip-flop circuits 118 and 120 thereby closing gate 121 and terminating the burst of six transfer pulses. This same resetting output from counter 126 also actuates gate 127, which had been previously enabled by the $M_2$ output of mode control counter 31, to advance sample address counter 42. The reset outputs from flip-flops 118 and 120 are coupled through a gate 128 to reset counter 126 to zero.

Bursts of twelve advance pulses are now available on lead 107, and bursts of six transfer pulses are available on lead 123. Accordingly, the description of the actual averaging operation under the control of these bursts of pulses may be carried forward. A matching pulse from lead 100 actuates gate 22 to apply a sample of the received standard signals to coder 23 as previously described. Each sample is measured by coder 23. The binary representation of its magnitude is stored in the coder output flip-flops 70 through 74, and its sign is stored in flip-flop 75. When a zero count in twelve-counter 102 and a zero count in six-counter 126 coincide with an $M_2$ output from mode control counter 31, a gate 130 in FIG. 9 is activated to enable control gates 131 through 140. The latter gates couple the magnitude portions of the binary representation from flip-flops 70 through 74 to leads 141 for transmission through OR gates 142 through 151 in FIG. 10 to the respective input connections of a five-stage shift register 152.

Figure 8:
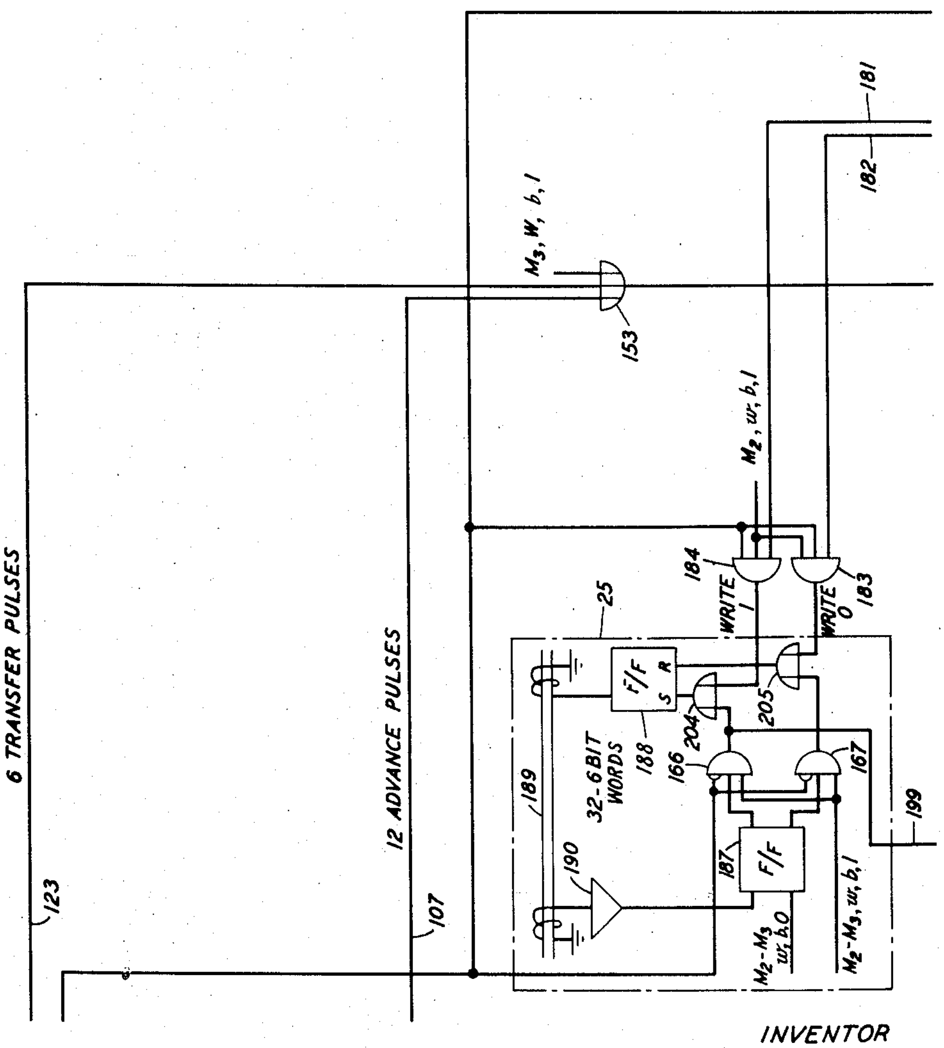

Twelve advance pulses from lead 107 in FIG. 8 are applied through an OR gate 153 in FIG. 8 to the shift input connections register 152 for moving the binary coded sample magnitude information through an AND gate 156 and an OR gate 157 to the input of an accumulator loop. An additional enabling input on gate 156 is supplied from the $M_2$ lead of mode control counter 31 and an inhibiting input is provided from the set output of flip-flop 120 in FIG. 7 to prevent the movement of this binary information as described when transfer pulses are being generated and applied to lead 123 as previously discussed.

Figure 10:
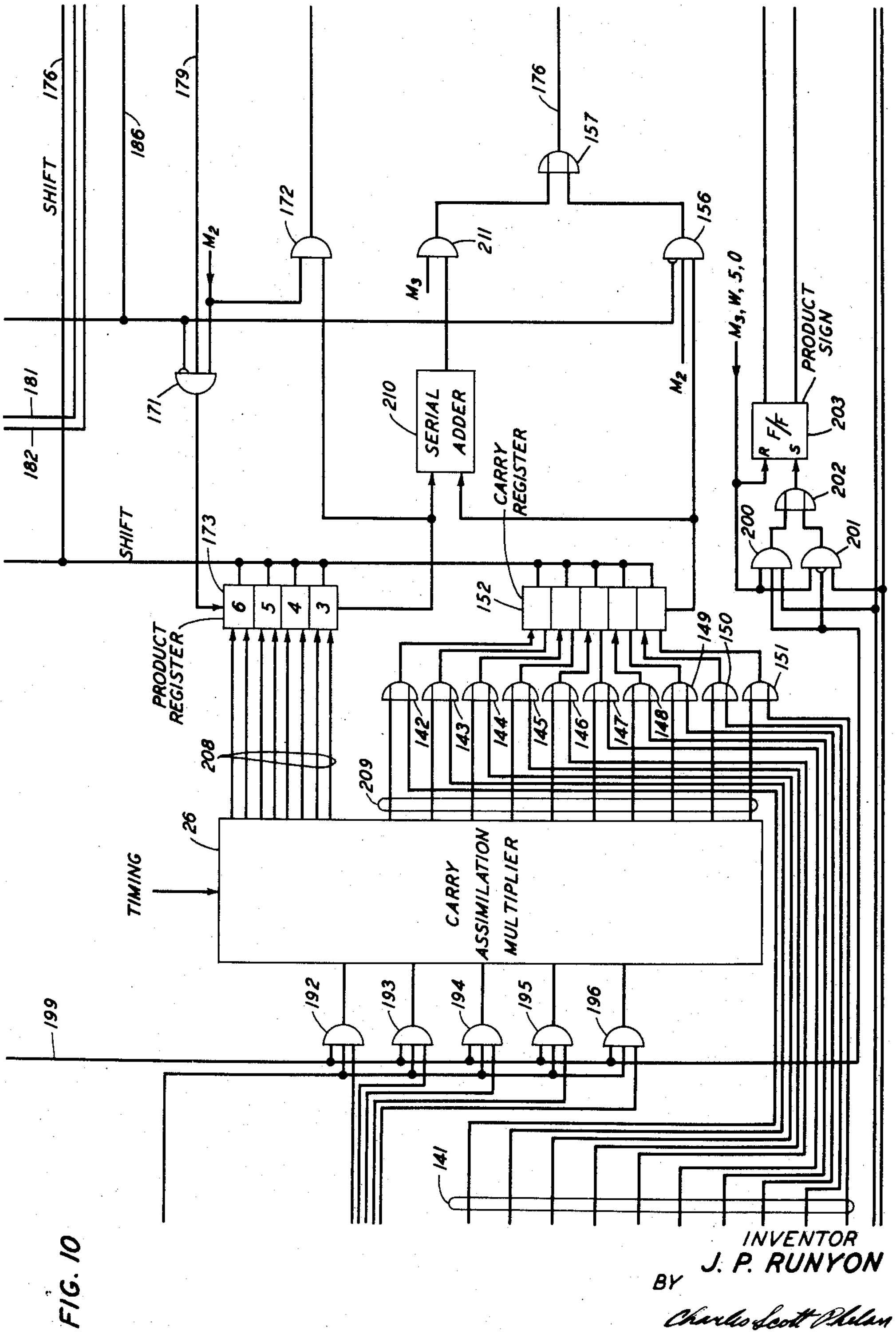
Figure 11:
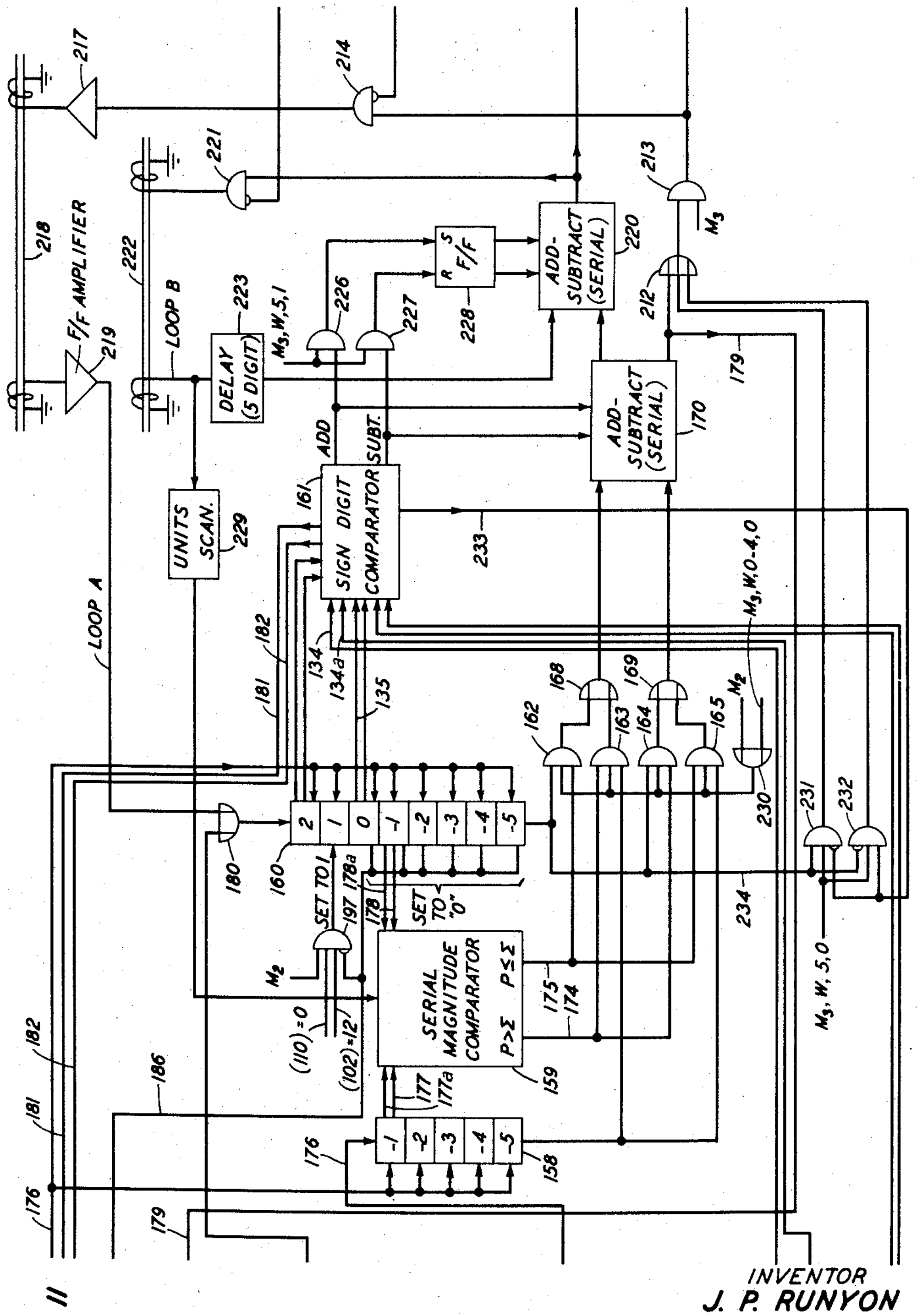

The accumulator for the averaging mode appears partly in FIG. 10 and partly in FIG. 11. It includes a five-stage shift register 158, a magnitude comparator 159, an eight-stage shift register 160, a sign digit comparator 161, AND control gates 162 through 165, OR control gates 168 and 169, an add-subtract circuit 170, AND gates 171 and 172, and a four-stage shift register 173 shown in FIG. 10. Register 158 is provided for reading information into the accumulator, and registers 160 and 173 provide twelve bit-storage places.

An AND gate 197 is arranged to inject a ONE in the 1 stage of register 160 during the averaging mode upon coincidence of a full count in twelve-counter 102 and a zero count in four-counter 110. This operation assures unbiased roundoff for the accumulation operation. At all other times there is no output from gate 197 and the 1 stage of register 160 simply takes whatever information is shifted into it during operation.

Serial binary information from gate 157 in FIG. 10 is shifted bit-by-bit into register 158 by the twelve advance pulses applied thereto from gate 153 over a lead 176. Register 158 includes stages designated −1 through −5, and the −1 stage is connected by leads 177 and 177*a* to one input of comparator 159. Comparator 159 also receives for comparison purposes, by leads 178 and 178*a*, information residing in the −1 stage of register 160 which includes the stages −5 through +2. Comparator 159 compares information in register 158 with accumulated information in register 160 on a bit-by-bit basis and determines which word is the larger. The details of this operation will be hereinafter discussed, along with the details of sign digit comparator 161, in connection with FIG. 13.

The output connections 174 and 175 from comparator 159 are actuated to indicate either that the new binary word is larger than the accumulated sum or that the accumulated sum is at least equal to the new binary word, respectively. Connections 174 and 175 enable either gates 163 and 164 or gates 162 and 165 to direct the output of register 158 to one of the OR gates 168 and 169 and to direct the output of register 160 to the other one of the latter gates. This operation, together with the operation of sign digit comparator 161, permits add-subtract circuit 170 to perform either addition or subtraction as may be necessary in accordance with the relative magnitudes and polarities of the words from registers 158 and 160.

Information in register 160 is shifted around the full accumulator loop by the twelve advance pulses supplied to the stages thereof from the lead 176. A lead 179 couples the output of add-subtract circuit 170 back through gate 171 in FIG. 10. The four-stage register 173, which is also operated by the twelve advance pulses applied from the output of gate 153, receives the output from gate 171. Output bits from register 173 are applied through AND gate 172 and an OR gate 180 back to the input of register 160. Gates 171 and 172 are enabled by the $M_2$ output from mode control counter 31; and, in addition, gate 171 has an inhibiting input from the set output of flip-flop 120 in FIG. 7 to prevent the movement of pulses as described when the six transfer pulses are being generated.

Thus, each time a signal sample is taken and encoded, a burst of twelve advance pulses shifts the encoded information into the previously described accumulator loop. The information is there combined with any previously accumulated binary magnitude representations of signal samples as indicated in FIG. 4B. Four-counter 110 determines when four such samples have been taken and directs the storage of the accumulated average by initiating a burst of six transfer pulses. The transfer pulses are applied from lead 123 in FIG. 8 through gate 153 to operate the shift registers 152, 158, 160, and 173 in FIGS. 10 and 11.

The sum of four five-digit binary words may include as many as seven digits, but it is desired to store only the five most significant digits of the sum. These five lie in stage 2 of register 160 and in the four stages of register 173. Therefore, readout is taken from stage 2 of register 160 and information in stages 1 through −5 is ignored. During the generation of the transfer pulses, gates 156 and 171 are inhibited by the set output of flip-flop 120 in FIG. 7, and all information in stages zero through −5 of register 160 is erased as these stages are reset to zero by the same inhibiting signal on a lead 186. If a ONE should be in stage 1 of register 160 when readout begins, it is erased when shifted to stage 2 which is clamped to ZERO by the signal on lead 186. Accordingly, when the six transfer pulses have ended, registers 160 and 173 are empty.

An enabling input on each of the loop store input gates 183 and 184 in FIG. 8 from the set output of flip-flop 120 prevents the application of information to store 25 from stage 2 of register 160 except during the six transfer pulses. The six transfer pulses now shift the five most significant bits of the accumulated information from stage 2 of register 160, and stages designated 3 through 6 in register 173, through sign digit comparator 161 and leads 181 and 182 to enabling inputs of gates 183 and 184 in the input of loop store 25. Gates 183 and 184 have additional enabling inputs supplied from the $M_2$ lead of mode control counter 31.

As seen in FIG. 8, loop store 25 includes two flip-flop circuits 187 and 188 connected in a closed delay loop wit ha magnetostrictive delay line 189 and an amplifier 190. Operation of the store 25 is controlled by a pair of AND gates 166 and 167 with enabling inputs from flip-flop 187 and from timing $H_2$—$M_3,w,b,1$. This timing designation means that gates 166 and 167 receive enabling inputs during clock phase one for every bit of every word in both the averaging and equalizing modes of operation. The subject of timing will be more fully discussed subsequently in connection with the equalizing mode of operation.

Gates 166 and 167 have inhibiting inputs also, and those inputs are actuated by the set output of flip-flops 120 in FIG. 7. These inputs, when actuated, have the effect of erasing six bits of information to prevent them from recirculating to the input of line 189 during the generation of the six transfer pulses. By this device a word space is cleared to facilitate the simultaneous operation of writing a new word in that space.

Two OR gates 204 and 205 are included in the inputs to flip-flop 188 so that circuit may be operated either by recirculated data or by new data received from the arithmetic unit 24 during the averaging mode of operation. New data is received through gates 183 and 184 and is shifted into loop store 25 by timing phase one.

During each bit of each word of timing in the averaging and equalizing modes, flip-flop 187 is reset on phase zero and gates 166 and 167 are enabled on phase one. Thus, once during each bit time flip-flop 187 is reset, and an indication of its condition is shifted by the timing phase one through one of the AND gates 166 and 167, a corresponding one of the OR gates 204 and 205, and flip-flop 188 to the input end of line 189. If a ONE is received from amplifier 190 after flip-flop 187 has been reset, flip-flop 187 is set once more; and a ONE is shifted into the input of line 189. The ONE is also coupled over lead 199 to the multpilier input gates 192 through 196 in FIG. 10. In the absence of a ONE from amplifier 190, flip-flop 188 is held in its reset state; and no new pulses are applied to line 189.

The reference characters applied to individual stages of register 160 in FIG. 11 indicate that the binary point for the accumulated word would normally lie between the stages designated "−1" and "0." However, since the magnitude readout to loop store 25 is derived from stage 2 during five bit times, the accumulated remaining magnitude information in stages 1 through −5 is discarded so that the binary point of the magnitude stored in loop store 25 is in effect left-shifted two digits. Since the accumulated word included the total of four words, the shifting of the binary point in the total to the left by two digits automatically takes the average of the accumulated factors.

Sign information for the stored word is supplied from coder output flip-flop 75 in FIG. 9 and applied to the input of sign digit comparator 161 in FIG. 11. Comparator 161 then applies appropriate control signals to add-subtract circuit 170, as will be described in connection with FIG. 13, and also applies the appropriate ONE or ZERO to indicate sign in the sixth bit position on leads 181 and 182, as will also be described.

A clearer concept of the timing involved in the previously described averaging operation may be obtained by reference to FIGS. 15A through F. FIG. 15A shows a standard impulse at the output of source 20′, and FIG. 15B shows roughly how that impulse would appear at the output of amplitude equalizer 44. The ticks on the abscissa of FIG. 15B represent impulse response sampling locations. $\alpha$ is the time spacing between successive sampling locations. $\beta$ is the duration of the impulse response. $\gamma$ is the uncertain time interval between the end of one received impulse and the beginning of the next; and $\gamma$ may vary widely during any transmission.

FIG. 15C shows output pulses from matcher 60. The time spacing between these pulses during the averaging of four samples for a single sample location $i$ would be equal in magnitude to $\beta+\gamma$. However, when one sample is at location $i$ and the next is at location $i+1$, the time spacing between the corresponding matcher output pulses is equal in magnitude to $\beta+\alpha+\gamma$.

FIG. 15D shows the loop address counter impulses, and the smallest marks along the abscissa axis of the figure indicate raw clock pulses occurring at the bit rate of loop store 25. The intermediate sized marks occurring at the word rate of loop store 25 represent advance pulses coupled from counter 90 to counter 91; and the largest marks represent output pulses from counter 91 upon attainment of a full count. The time interval between full counts on counter 91 is designated "$\alpha$" to facilitate comparisons with the other voltage diagrams. $\alpha$ corresponds to the time spacing between successive sampling locations in a received standard impulse in FIG. 15B as previously noted.

The signal responsive counter pulses are illustrated in 15E and are similar to those in FIG. 15D from the loop address counters, but they are synchronized with the FIG. 15D signals only insofar as the raw clock pulses are concerned. The signal responsive counters may start at any random time depending upon the moment at which an impulse is received from detector 51, but counters 90 and 91 operate continuously. In addition, the FIG. 15E includes a fourth counter pulse train illustrated as the largest impulse in FIG. 15E and occurring at a further low frequency which represents the output of counter 59 upon attainment of full count. The time interval required to attain a full count on counter 59 is designated "$\beta$" in FIG. 15E, and corresponds approximately to the duration of the impulse response interval of the transmission system being equalized. The uncertain time interval between applications of start signals from detector 51 to counter 57 during gain adjusting and response averaging modes is designated "$\gamma$" in FIG. 15E.

In FIG. 15F are shown the control pulses generated in the response averaging mode upon the occurrence of the fourth sample at a particular sampling location $i$. The first sample is taken at a time $t_1$ during the interval $\beta$ for the first of four impulses to be sampled at location $i$ as controlled by sample address counter 42. At the start of the $\alpha$ interval for the location to be sampled, the sample is taken; and in the next $\alpha$ interval the twelve advance pulses are started, as previously described, to shift the binary representation of sample magnitude into the accumulator. Two additional samples at location $i$ are taken during the next two $\beta$ intervals and initiate two additional bursts of twelve advance pulses in a similar manner. During the fourth standard impulse, i.e., the fourth $\beta$ interval, received for averaging at a particular sample location $i$, the twelve advance pulses are produced as before; but this time they are followed by six transfer pulses as illustrated in FIG. 15F. The transfer pulses shift the average sample magnitude into loop store 25 from the accumulator loop.

After the six transfer pulses have been counted off, sample address counter 42 is advanced as previously described. When a new standard impulse causes the signal responsive counters to resume operation, they count up to the new level indicated by counter 42; and then matcher 60 produces another sampling impulse to initiate an additional sample interval $\alpha$. The previously described operation now repeats for the $i+1$ sample location for four standard impulses, and the average of these impulses is written in the $i+1$ word location of loop store 25.

After sample address counter 42 has been advanced in the averaging mode through all of the sample locations in the impulse response of the transmission system to be equalized, it spills over through gate 86 and OR gate 32 to advance the mode control counter 31 thereby activating lead $M_3$ and deactivating the other output leads of counter 31.

*Equalizing Mode*

The voltage signal on lead $M_3$ of mode control counter 31 actuates gates for revising the equalizer connections to perform equalization for the transmission system 21 under consideration. Thus, this signal inhibits gate 48 in FIG. 6 to block the application of further standard signal pulses from source 20′. It also inhibits gate 86 in the spillover output of sample address counter 42.

A gate 191 is enabled in FIG. 6 to couple information signals from a source 20″ to amplifier 49 through system 21 and equalizer 44. The $M_3$ lead signal also enables gates 192 through 196 in FIG. 10 to couple coded sample magnitudes to the input of multiplier 26 in arithmetic unit 24. A lead 199 in FIGS. 8 and 10 couples an output from the one-bit shift register 187 to gates 192 through 196 of multiplier 26 and to an enabling input of gate 200 and an inhibiting input of gate 201. The latter two gates supply sign information from flip-flop 75 in FIG. 9 through an OR gate 202 to product sign flip-flop 203 in FIG. 10. The $M_3$ output also establishes new operating connections in arithmetic unit 24, as will be described, and is coupled through OR gate 67 in FIG. 9 to enable the timing gates 68 which will control operation of flip-flops 70 through 75.

In the equalizing mode of operation, signals are sampled in synchronism with information shifts in loop store 25. Synchronism is achieved by means of timing signals derived from loop address counters 90 and 91 in FIG. 7. Operations which must take place at certain bit times corresponding to particular clock pulses in FIG. 15D are initiated by signals derived from certain stages in counter 90. Similarly, word timing is derived from certain stages in counter 91. This technique, which is well known in the art, involves many output leads from the counters. Such leads are schematically represented by leads 206 and 207 from counters 90 and 91, respectively. Since it is sometimes desirable to have two things happen at almost, but not exactly, the same time, a branch lead **122*a* is taken from clock output lead 122; and a one-half-bit delay 208 is inserted in branch lead 122*a*** to provide two phases, zero and one, of clock voltage. Any particular timing is achieved by carrying the desired mode, word, bit, and phase timing leads to a coincidence gate controlling the lead to be timed. However, in order to keep the drawing simple, connections to the timing outputs are indicated by adding a reference character to a timed lead indicating that it is controlled by a certain mode control output and certain word, bit, and phase timing.

For example, a timing lead designated "$M_3,w,b,0$" is actuated in the equalizing mode by every word timing pulse and every bit timing pulse in phase zero. Another lead designated "$M_3,31,5,1$" is actuated in the eqaulizing mode by the timing for phase one of the sixth bit (bit five in the usual numbering system wherein the first item is numbered "0"), of the thirty-second word.

It will be noted that no inverting inputs are shown in connection with lead 207 although inverting inputs are shown to couple counter 91 outputs to matcher 117. Thus, the timing signals obtained on the output lead 207 are the complements of signals on output leads from corresponding counter stages to matcher 117. The effect produced is that equalizing operations timed for word zero take place in coincidence with the readout of impulse response word 31 from loop store 25 and vice versa. Consequently stored impulse response information is utilized in a time-reversed manner with respect to the manner in which it was originally received so that equalization performed by the stored impulse response information has the desired effect of phase equalizing received signals.

Continuing now with the description of the equalizing operation, sampling gate 22 is enabled by the timing $M_3$,0,0,0. This is one-half of a bit after the coder flip-flops 70 through 75 have been enabled by the timing $M_3$,31,5,1 applied through OR gate 67 in FIG. 7 to timing gates 68.

Figure 14:
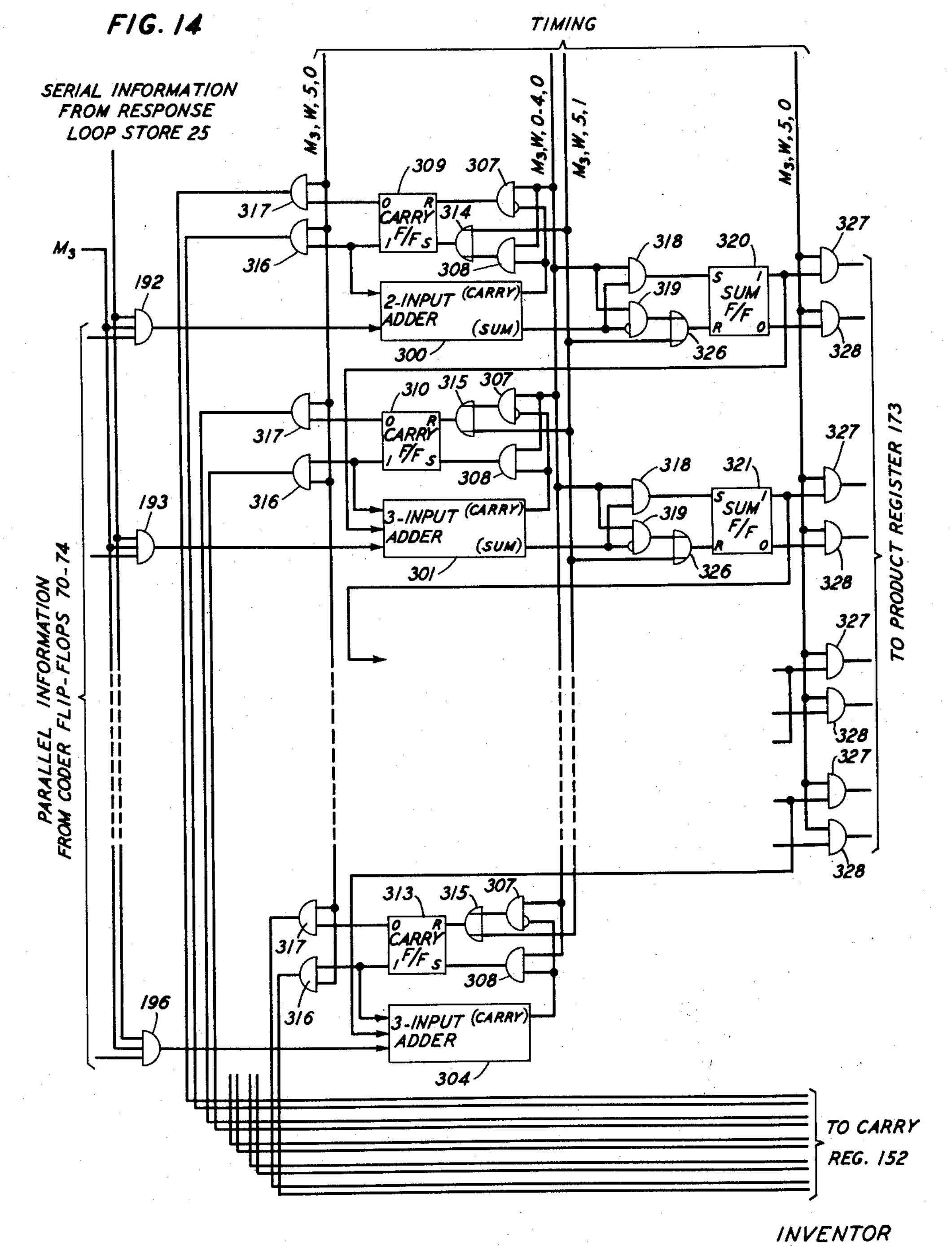

All ONE outputs of flip-flops 70 through 74 are connected to enabling inputs of multiplier input gates 192 through 196. The latter gates are activated by stored bits applied serially from register 187 under the influence of timing $M_3,w,b,1$. Multiplier 26, the details of which will be described subsequently in connection with FIG. 14, is of a type which produces four parallel outputs on leads 208 for the four most significant product digits and produces five parallel outputs on leads 209 for up to five carry digits generated in the multiplication operation. Timing information applied to multiplier 26 causes the multiplier to read out on the leads 208 and 209 to the register 173, now called "product register", and the register 152, now called "carry register", respectively.

Raw clock pulses, that is, timing $M_3,w,b,1$, are applied to all shift registers of arithmetic unit 24 through OR gate 153 in FIG. 8. These pulses shift the product and carry information serially from registers 173 and 152 to the inputs of a serial adder 210 wherein the product and carry words are added together bit-by-bit.

A few words of explanation about registers 152 and 173, and adder 210 are in order at this point. Coder 23 includes five magnitude digits and one sign digit in its output. The accuracy of the least significant magnitude digit is in doubt because it necessarily is the result of a roundoff since no less significant digits were recognized by the coder. Both the stored response magnitudes and the received signal magnitudes, therefore, include only four accurate digits, and their ten-digit product also includes only four certainly correct digits. However, only five digits are required from the multiplication. Registers 152 and 173, and adder 210 are employed in conjunction with multiplier 26 so that carries generated during multiplication may be assimilated in series rather than in parallel. By this means the multiplier 26 is tied up for only five bit times rather than the ten that would be required if carry were assimilated serially.

As will be seen in the detailed consideration of multiplier 26 in connection with FIG. 14, carries are assimilated in parallel through each of the five bit multiplication steps. During the sixth bit time, when sign information is being treated, the product and carry words are loaded into registers 173 and 152, respectively, thereby clearing multiplier 26. Then while the next stored response word is being multiplied, the last carry assimilation step of the previous multiplication is being performed bit-by-bit by adder 210.

The sum of the product and carry information is coupled through an AND gate 211 and the OR gate 157 to the input of register 158 where it is compared by magnitude comparator 159 with information stored in a new accumulator loop to be described. Comparator 159 operates as previously described in connection with the averaging operation to steer information from register 158 and register 160 to the proper inputs of add-subtract circuit 170.

The new accumulator loop for the equalizing mode of operation actually comprises two recirculating delay loops. In the first loop, loop A, add-subtract circuit 170 and its input control gates are connected in series with shift register 160, control gates 212, 213, and 214, amplifier 217, a magnetostrictive delay line 218, a flip-flop amplifier 219, and OR gate 180. The set-to-zero inputs on stages zero through —5 of register 160 are no longer activated because in the $M_3$ mode the input gates to the signal responsive counters 57 through 59 and sample address counter 42 are disabled. Consequently there is no output from matcher 60 to cause the various circuits to be operated for enabling gate 113, and ultimately triggering flip-flop 120 for resetting the register 160 stages to zero. This accumulator loop has a storage capacity of 33 six-bit words; that is, it has one more word position than does the impulse response loop in response store 25. However, the arithmetic unit is receiving 32 five-digit response magnitude words for each of the 32 signal sample impulses, and must store sign information for each word of the accumulated total. Since the sum of 32 five-digit words is a ten-digit word, and 32 sign bits must be stored, at least 352 bit storage spaces are required. Accordingly, a second accumulator loop, loop B, is provided to receive carry outputs from add-subtract circuit 170. Loop B includes an additional add-subtract circuit 220, a control gate 221, a magnetostrictive delay line 222, and a fixed five-digit delay unit 223. The second loop has the same capacity as the first loop, and information in it is advanced at the same rate. Since loop B receives no information for storage until a carry bit is generated in loop A, each loop B word actually occurs one word time after its loop A counterpart. In order that a timely indication of the content of loop B may be supplied to magnitude comparator 159, delay line 222 is made five digit lengths shorter than delay line 218 in loop A; and delay 223 is provided to supply the difference. A units-scan circuit 229 then supplies a coupling link from the output end of loop B to magnitude comparator 159 as will be described.

Sign information is supplied from comparator 161 through timing gates 226 and 227, and a flip-flop circuit 228, to add-subtract circuit 220 during bit five, phase one, of each word, The units-scan circuit 229 interconnects the output of delay line 222 with magnitude comparator 159 to indicate the presence of a carry digit.

These two accumulator loops A and B operate together, as described in connection with FIG. 2, to produce in each signal sampling time slot, i.e., accumulator loop word position, an accumulated binary word which represents the summation of all equalized elemental signal impulse portions overlapping that time slot. In FIG. 3, for example, the equalized signal has its principal peak in time slot five. If a continuous signal were being equalized, an adjacent elemental signal impulse may have its principal peak in time slot six and have one skirt portion overlapping time slot five. When the accumulator word position containing the equalized peak illustrated in time slot five of FIG. 3 is read out, it includes the summation of that peak plus all skirt portions of other equalized impulses accumulated in that word position since its next previous readout.

An OR timing gate 230 passes timing signals during bits zero through four, phase zero, of every word to enable gates 162 through 165 in accumulator loop A to permit the accumulation of magnitude information as described. During the bit five, phase zero, of each word, timing gates 231 and 232 are partially enabled by timing signals. New sign information on lead 233 from sign comparator 161, and accumulated sign information from register 160 on lead 234, co-operate to enable fully one of the gates 231 and 232, and to inhibit the other one, for injecting the proper sign in the output of add-subtract circuit 170 during this bit five. As will be seen in connection with FIG. 13, magnitude comparator 159 is blanked during this bit five and does not respond to the passage of the accumulated sign digit through stage —1 of register 160.

Figure 12:
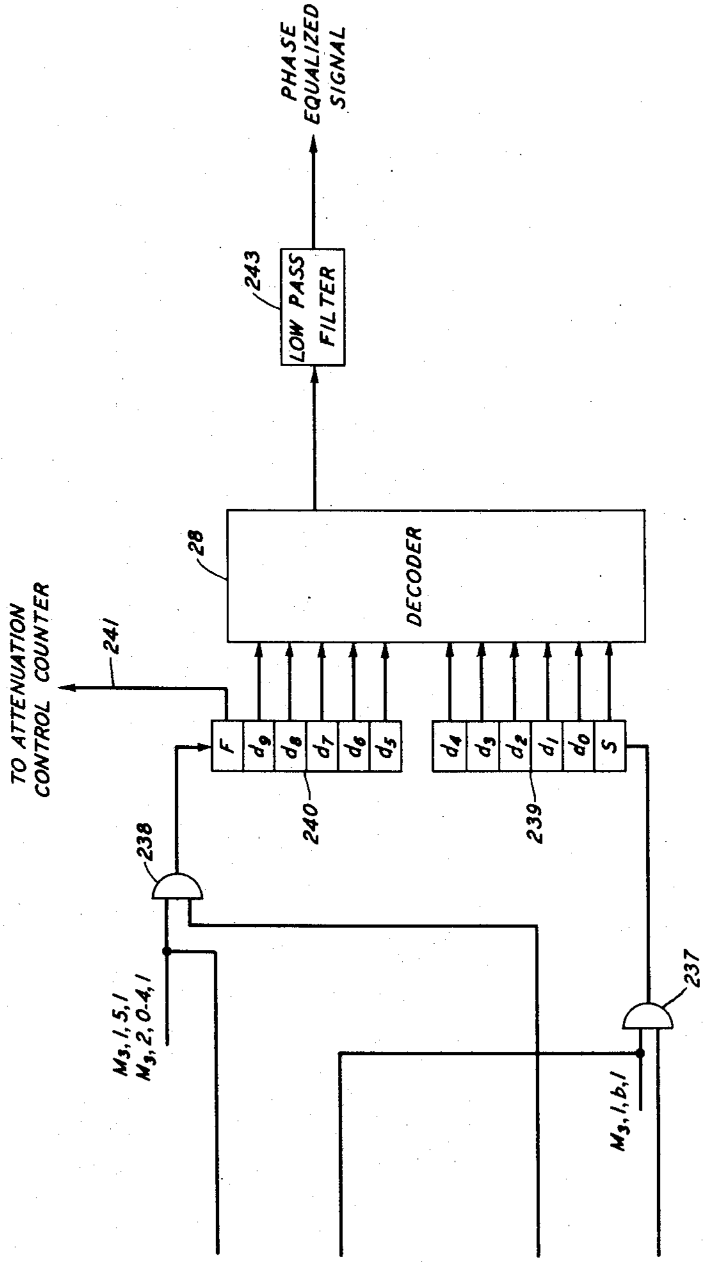

Readout from accumulator loops A and B is accomplished at the correct time by timing gates 237 and 238, respectively, in FIG. 12. Gate 237 is enabled by timing $M_3,1,b,1$ and gate 238 is enabled by timing $M_3$,1,5,1 and $M_3$,2,0–4,1, respectively, to couple information from loop A to a shift register 239 and from loop B to a further shift register 240. The readouts occur serially to registers 239 and 240, and these registers operate the decoder 28. Sign information is applied to decoder 28 by the S stage of register 239 which represents the sixth digit in the word read from the loop A.

The sixth carry digit in the word from loop B appears in the F stage of register 240 and is coupled back by a lead 241, and by gates 242 and 79 in FIG. 9 to the attenuation control counter 38 in FIG. 7. A signal on lead 241 indicates that the information being received from source 20″ is of such magnitude that it tends to overload decoder 28. Accordingly, counter 38 in FIG. 7 is advanced to crank down the gain of amplifier 49.

A low pass filter 243 may be connected to the output of decoder 28 when the signal being received from source 20″ is a continuous signal as distinguished from a digital signal. The phase-equalized signal appears in the output of filter 243.

Operation of the equalizer continues uninterrupted with samples of received signals being extracted by gate 22 in synchronism with the operation of response loop store 25. These samples are encoded in binary form by coder 23, and multiplied by the stored, time-reversed, impulse response in multiplier 26. The modified pulses are recombined on a real-time basis in accumulator loops A and B, and the accumulated correction is read out to a decoder 28 which produces the phase-equalized signal. A stop pulse from source 246 in FIG. 9 resets mode control counter 31 to restore the equalizer to its quiescent condition.

*Magnitude and Sign Comparators*

Figure 13:
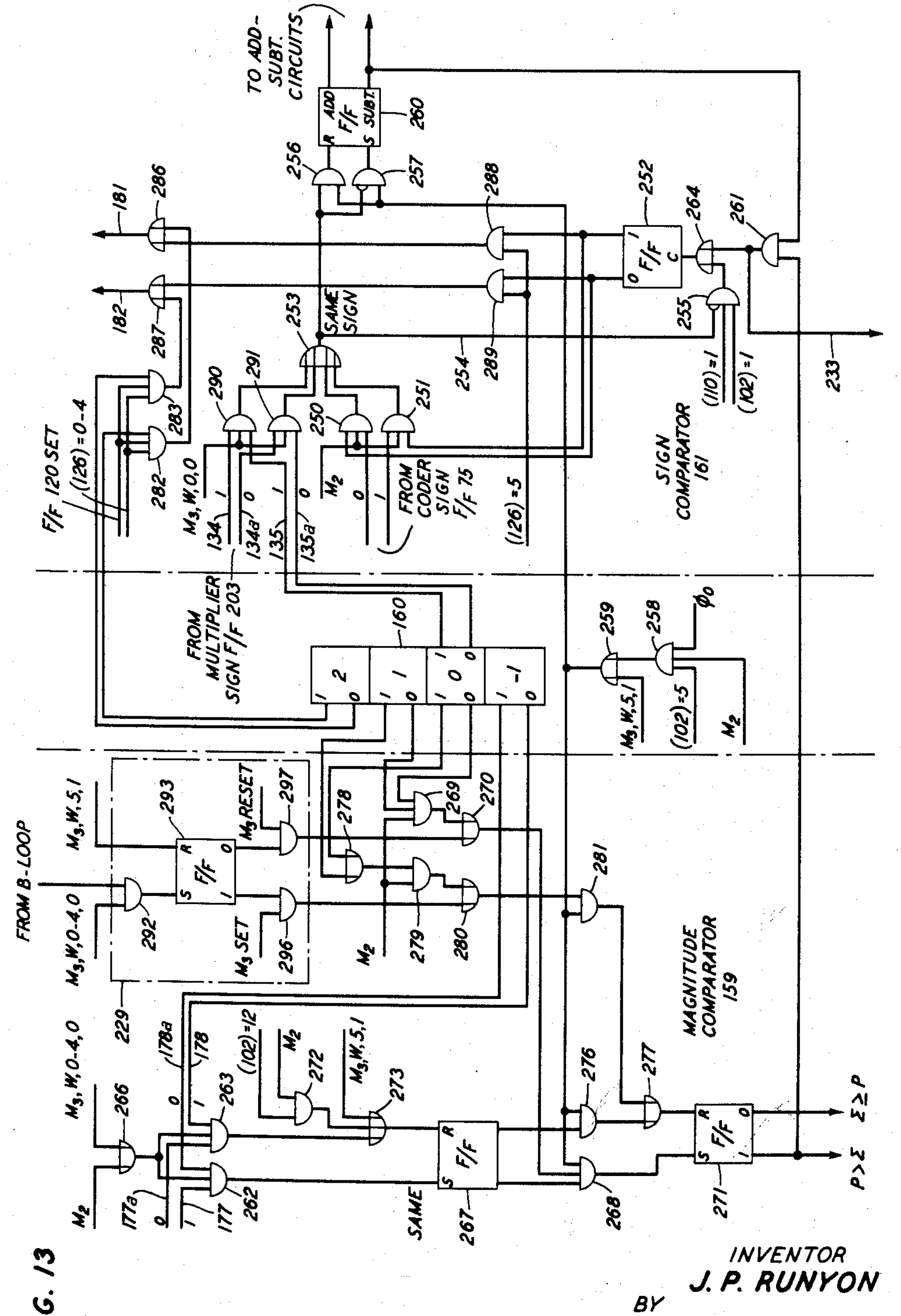
FIGS. 13 and 14 are block and line diagrams of portions of an arithmetic unit in FIG. 1.

The co-operative relationship of comparators 159 and 161, which were employed during both the response averaging and the equalizing modes of operation, may be seen in detail upon reference to FIG. 13. In that figure, stages 2 through −1 of register 160 are shown in the central portion of the figure with the magnitude comparator 159 to the left and the sign comparator 161 to the right with substantially the same orientation as in FIG. 11.

Consider first the impulse response averaging mode of operation. Two AND gates 250 and 251 in the sign digit comparator 161 are partially enabled by a voltage on the $M_2$ lead of mode control counter 31. Gate 250 also receives the ZERO output leads from coder flip-flop 75 in FIG. 9 and from a flip-flop circuit 252 which indicates the current sign in the accumulator loop. Gate 251 similarly receives the ONE output leads from flip-flops 75 and 252. If the new word and accumulated word signs indicated by flip-flops 75 and 252 are the same, one of the gates 250 or 251 is enabled and passes a signal through an OR gate 253 to an enabling input on an AND gate 256 and an inhibiting input on an AND gate 257. When the content of twelve-counter 102 in FIG. 7 is equal to five, a timing signal is coupled through an AND gate 258 and an OR gate 259 in FIG. 13 to actuate gate 256 and reset a flip-flop 260 thereby indicating at the output of sign digit comparator 161 that an addition is to be performed.

If the signs indicated by flip-flops 75 and 252 are different neither gate 250 nor 251 produces an output and flip-flop 260 is set when the content of twelve-counter 102 reaches five. The setting of flip-flop 260 indicates at the output of sign digit comparator 161 that a subtraction is to be performed, and it also partially enables an AND gate 261.

A further enabling signal for gate 261 is obtained from the magnitude comparator 159 if the magnitude of the new binary word in register 158 exceeds the magnitude of the accumulated word in register 160, as will be described. The output of gate 261 is coupled through an OR gate 264 to a complementing input of flip-flop 252. Upon each actuation of gate 61, flip-flop 252 is caused to change state thereby indicating that the new word is larger than the accumulated word, and that their signs are different.

The output of gate 253 which was employed to control flip-flop 260 is also coupled by a lead 254 to an inhibiting input of an AND gate 255. Enabling inputs are provided to gate 255 from twelve-counter 102 and four-counter 110 in FIG. 7, and they tend to enable gate 255 when both counters are at a count of one and the signs being considered by comparator 161 are different. Thus, at the beginning of the first series of twelve advance pulses for any particular impulse response location, if the signs being considered are different, an output is produced by gate 255. This output is coupled through OR gate 264 to the complementing input of flip-flop 252 thereby changing the sign indication in its output. This operation assures proper utilization of the ONE stuffed in stage 1 of register 160 in FIG. 11 for unbiased roundoff. Proper utilization is assured because an addition is forced between the stuffed ONE and the first of the four coded words to be added in the averaging mode accumulator loop.

It will be observed that in the averaging mode of operation sign digit information is never entered in the accumulator loop. Comparator 161 receives sign information from coder flip-flop 75 through a path which bypasses the accumulator and from flip-flop circuit 252 which keeps track of the sign of the accumulated sum. Sign directions from flip-flop 260 go directly to control inputs of add-subtract circuit 170 and to gate 261 for controlling flip-flop 252. When the time comes for writing in loop store 25 the average of four accumulated sample magnitudes, the sign of the average is shifted directly into store 25 from flip-flop 252 at the proper bit time without passing through the accumulator loop.

In magnitude comparator 159, AND gates 262 and 263 are operated by the ONE and ZERO outputs from the −1 stages of registers 158 and 160 to indicate which of the compared data words has a ONE in the most significant digit position in which they differ. Each gate has an enabling input from a ONE output of one register and a ZERO output of the other register, as well as an enabling input from the $M_2$ control lead applied through an OR gate 266. As illustrated in FIG. 13, gate 262 is actuated by bit disagreement when a ONE is in the −1 stage of register 158, and gate 263 is actuated by bit disagreement when a ONE is in the −1 stage of register 160. If there is no bit disagreement, both gates are disabled. The outputs of gates 262 and 263 drive set and reset inputs, respectively, of a flip-flop circuit 267 so the output of the flip-flop indicates which register had a ONE in the most recent bit disagreement of any particular word comparison.

Assuming that on the last bit disagreement of a word comparison there was a ONE in register 158, flip-flop 267 is set; and an AND gate 268 is partially enabled. If at this time in register 160 there is a ZERO in both the one and the zero stages, an AND gate 269 is enabled and couples a further enabling signal through an OR gate 270 to the gate 268.

Subsequently, the occurrence of a count of five in the twelve-counter 102 indicates that each magnitude bit of the newly encoded word has been compared with the accumulated word, and a signal is coupled through gates 258 and 259 to actuate gate 268. The output of gate 268 sets a flip-flop 271 thereby indicating at the output of magnitude comparator 159 that the magnitude of the newly encoded word in register 158 is larger than the magnitude of the accumulated information in register 160.

If at the end of a word comparison flip-flop 267 is set and there is a ONE in either the one or the zero stage of register 160, an OR gate 278 couples an enabling signal to an AND gate 279 which in turn activates another OR gate 280 to enable a timing AND gate 281. This time, upon the occurrence of the five count in twelve-counter 102 the timing signal from gates 258 and 259 activates gate 281 and couples a reset signal to flip-flop 271 through an OR gate 277. Thus, even though the bit-by-bit comparison of five bits indicated the word in register 158 to be the larger, the presence of a carry ONE beyond the fifth bit position in register 160 causes flip-flop 267 to be relieved of control. In this condition, flip-flop 271 indicates at the otuput of comparator 159 that the magnitude of the accumulated sum in register 160 is at least equal to the magnitude of the newly encoded word.

After a word comparison has been completed and flip-flop 271 operated to indicate which word is larger, twelve-counter 102 continues counting up to twelve. It then enables an AND gate 272 in FIG. 13 to couple a reset signal through an OR gate 273 to reset flip-flop 267 in anticipation of receiving the next new sample magnitude word.

If during a word comparison the last bit disagreement shows or ONE in register 160, gate 263 is actuated and resets flip-flop 267 through OR gate 273 if flip-flop 267 had been previously set. In this condition, as well as in the condition in which there are no bit disagreements during the word comparison, flip-flop 267 is in its reset state when the averaging accumulator bit time slot five occurs. If logic associated with stages one and zero indicates the absence of a carry ONE in both stages one and zero of register 160, gate 276 is actuated by time slot five timing thereby assuring a reset of flip-flop 271 to indicate that the accumulated total is at least equal to the new word. Similarly, if that logic shows a carry to be present, gate 281, as well as gate 276, is actuated to the same effect.

If will be readily apparent from the figure that in the averaging mode $M_2$ of operation the condition of flip-flop 271 can be changed only upon the occurrence of a count of five in twelve-counter 102. In other words, since comparator 159 operates on a bit-by-bit basis and considers the least significant digit first, the condition of flip-flop 271 is controlled by the most significant digit position in which the accumulated sum and the newly encoded word are different.

When it is time in the averaging mode of operation to read out accumulated information from the accumulator loop to the loop store 25, the set output of flip-flop 120 in FIG. 7 partially enables gates 282 and 283 in the sign digit comparator 161 of FIG. 13. The counts zero through four in six-counter 126 in FIG. 7 further enable gates 282 and 283 to couple the ONE and ZERO outputs, respectively, from stage 2 of register 160 to OR gates 286 and 287, respectively. During count five in six-counter 126, AND gates 282 and 283 are no longer enabled, but AND gates 288 and 289 are enabled to couple the outputs of flip-flop 252 to OR gates 286 and 287. The outputs of the latter two gates are connected to loop store 25 by leads 181 and 182. Now the five-bit magnitude and the one-bit sign representing the average value of the standard signal impulse at a certain impulse response location time $t_i$ has been completely stored in loop store 25.

Consider now the equalizing mode of operation for the magnitude comparator 159 and the sign digit comparator 161 as shown in FIG. 13. Sign digits from product sign flip-flop 203, in FIG. 10, and from the zero stage of shift register 160, are compared by gates 290 and 291. The latter two gates are actuated by timing $M_3,w,0,0$; and if the sign digits are the same a signal is coupled through gates 253 and 256 to reset flip-flop 260 with the same external results as previously described in connection with the response averaging mode of operation. However, if the sign digits are different gates 290 and 291 produce no output, and flip-flop 260 is set by timing $M_3,w,5,1$ applied through OR gate 259 and the gate 257 to direct a subtraction.

It will be recalled that in the averaging mode of operation sign information was not entered in the accumulator loop. In the equalizing mode of operation the situation is quite different because a large number of different accumulations are carried on essentially simultaneously. It is, therefore, more convenient to bypass the sign digit information around circuits performing arithmetic operations and carry it in the accumulator loop with the magnitude information to which it relates. Timing signals divert sign digits around add-subtract circuit 170 through gates 231 and 232. A lead 233 couples the output of gate 261 to gates 231 and 232 in FIG. 11. Any time that product magnitude is greater than accumulated magnitude, and a subtraction is ordered, the sign of the accumulated word under consideration is changed. The output of gate 261 disables gates 231 and enables gate 232. This latter operation causes a ONE or a ZERO to be entered in loop A in the output of add-subtract circuit 170 if there is a ZERO or a ONE, respectively, in the sign digit position in the output of register 160.

Turning now to the magnitude comparator 159, the operation in the equalizing mode is similar to the averaging operation already described. This time, however, the absence of a signal on the $M_2$ mode control lead disables gates 269 and 279, and the carry detection function which those gates helped to perform is now accomplished by the units-scan circuit 229. The latter circuit includes an AND gate 292, a flip-flop 293, and control gates 296 and 297.

AND gate 292 is partially enabled by timing $M_3,w,0\text{–}4,0$ in the equalizing mode. Gate 292 also receives an input from the units-scan circuit 229 to set a flip-flop 293 if a ONE digit appears in accumulator loop B. The set output of flip-flop 293 is coupled through set gate 296 and OR gate 280 to an enabling input of the timing gate 281. Timing $M_3,w,5,1$ actuates gate 281 to control the output of flip-flop 271 in the same manner that the five count in twelve-counter 102 previously exercised control during the averaging mode. The same timing $M_3,w,5,1$ also resets flip-flop 293 in preparation for the examination of the next B loop word. The reset signal is coupled through a reset gate 297 and an OR gate 270 for partially enabling gate 268 in the set input of flip-flop 271. Thus, if no carries appear in accumulator loop B, control of flip-flop 271 is exercised by flip-flop 267 as previously described in connection with the averaging mode of operation.

*Multiplier*

The block and line diagram of FIG. 14 illustrates the details of multiplier 26. Multiplier input gates 192 through 196 are indicated to show the relationship of FIG. 14 to multiplier 26 as illustrated in FIG. 10. The output of gate 192 supplies one input of a two-input adder 300, and gates 193 through 196 each supply an input of the three-input adders 301 through 304. Intermediate adders 302 and 303, and their associated circuits are not actually shown in FIG. 14 since they are merely repetitions of adder 301 and its associated circuits as indicated schematically by the broken lines between the multiplier stages of adders 301 and 304.

Each adder has a sum and a carry output lead. Adders 301 through 304 are conventional full adders which produce a sum output if one input lead is activated, a carry output if two input leads are activated, and a sum and a carry output if all three input leads are activated. Adder 300 operates in a similar manner insofar as its two inputs are concerned.

The carry output of each adder is coupled through timing control gates 307 and 308 to the set and reset inputs of carry flip-flops circuits 309 through 313, respectively. An OR gate 314 is included in the coupling from the output of the gate 308 driving the set input of carry flip-flop 309. Corresponding OR gates 315 are included in the connections to the reset inputs of carry flip-flops 310 through 313 from their respective gates 307. OR gates 314 and 315 are provided to establish the carry flip-flops in a desired initial condition at the end of each response word multiplication. This initial condition comprises carry flip-flop 309 set to have an initial injected ONE for unbiased roundoff, and all other carry flip-flops reset.

The ONE output of each carry flip-flop is coupled back to an input of its corresponding adder, and both the ONE and the ZERO outputs of each carry flip-flop are coupled by timing gates 316 and 317 to the respective stages of the carry register 152 in FIG. 10. Gates 316 and 317 of the most significant adder stage 300 are so coupled by OR gates 142 and 143, and the other adders are similarly coupled in descending order of significance through OR gates 144 through 151. Timing $M_3,w,5,0$ applied to gates 316 and 317 assures readout at the end of each response word multiplication.

The sum outputs of adders 300 through 303 are coupled through additional timing gates 318 and 319 to the set and reset inputs of sum flip-flops 320 through 323, respectively; and the ONE output of each of these sum flip-flops is coupled to an input of the adder in the next less significant digit position of the multiplier circuit. OR circuits 326 are provided between gates 319 and their respective sum flip-flop reset inputs to supply timing $M_3,w,5,1$ for establishing sum flip-flop initial conditions. The ONE and ZERO outputs of sum flip-flops 320 through 323 are connected to the respective stages 6, 5, 4, and 3 of the product register 173 in FIG. 10 by timing gates 327 and 328.

In each case in FIG. 14 where timing gates are employed to couple an adder output to a flip-flop, a pair of AND gates is employed; and the adder output tends to enable one gate of the pair and inhibit the other. Timing signals are applied in multiple to an enabling input of each of the timing gates in each pair. Each gate output is connected to a different input of its corresponding flip-flop circuit. Thus, an adder output to a flip-flop, in coincidence with a timing pulse, can set the flip-flop in the ONE condition, but it cannot reset the flip-flop if it had been in the ONE condition before the application of the adder output. However, the application of timing signals $M_3$, $w$,0–4,0 to a pair of timing gates in the absence of an adder output forces the corresponding flip-flop circuit to its reset condition. During bit five of each response loop word timing $M_3,w,5,0$ actuates gates 316, 317, 327 and 328 to read out sum information to product register 173 and carry information to register 152. Phase one of the same timing bit is applied to OR gates 314, 315, and 326 to re-establish multiplier initial conditions as before mentioned.

Functionally, the timing bits $M_3,w$,0–4,0 perform three jobs. They cause adder sum information to actuate an appropriate sum flip-flop; they cause a carry generated within an adder to be recirculated to the input of that same adder for use in the next multiplication step; and they cause the sum flip-flop information, the partial product, to be shifted to the next adder of less significance. This type of operation, wherein carries are assimilated in parallel during each step of the multiplication and the partial product is right-shifted prior to the production of the next partial product, results in a continuous roundoff process with a minimum amount of equipment.

While this invention has been described in connection with a particular arrangement of digital apparatus for accomplishing automatic phase equalization, other arrangements which will be apparent to those skilled in the art, and which utilize the underlying principles of the invention, are included within the scope of the invention.

What is claimed is:

1. Apparatus for correcting phase distortion imposed upon a communication signal of multiple frequency content in passage from a signal source to a receiver through an amplitude-equalized transmission medium having a velocity dispersive effect upon the different frequency components of signals applied thereto, said apparatus comprising means storing binary representations of the magnitudes of consecutive samples of the response of said medium to a test signal of uniform frequency content throughout the transmission band of said medium, means sampling electrical information received from said medium, means encoding in $m$-digit binary words the magnitude and polarity of samples in the output of said sampling means, means multiplying each of said binary words by said stored response sample representations, an accumulator totaling products from said multiplications, and a binary-analog decoder converting accumulated binary product totals into analog voltages.

2. An automatic phase equalizer comprising means encoding in $m$-bit binary-word form plural successive samples of received signals, means storing a plurality of $m$-bit binary-word representations of phase correction signals peculiar to the impulse response of a transmission medium to be equalized, a binary productor multiplying each binary signal sample word by said binary phase correction words to produce phase-distorted samples simulating the retransmission of said sample through said medium in time-reversed manner, an accumulator partially superposing said phase-distorted samples, means reading out word totals from said accumulator at the rate of occurrence of said samples, and means translating each word total in the output of said readout means into an equivalent electrical impulse.

3. An automatic phase equalizing system comprising a source of alternating clocking voltage, an amplifier for receiving signals, said amplifier having gain adjusting means, a signal sampler connected to the output of said amplifier, an encoder representing in a digital form the magnitudes of signal samples produced by said sampler, address counting means responsive to said clocking voltage and causing said sampler to operate at predetermined times, means storing signal samples representing the typical impulse response of a transmission medium to be equalized for an impulse of a predetermined configuration, said impulse response samples being stored in said digital form, arithmetic means for operating upon coded signal sample magnitudes in the output of said encoder, a digital-analog translator for converting a digitally coded magnitude into an analog electrical signal, and mode controlling means responsive to the output of said address counting means programming said eqaulizing system for three different successive modes of operation, in the first of said modes said address counting means and said encoder are interconnected with said gain adjusting means to set the gain of said amplifier to match the capacity of said encoder for a predetermined signal, in the second of said modes said address counting means and said encoder are interconnected with said arithmetic unit and said storing means for determining and storing the impulse response of said transmission medium to said predetermined impulse, and in the third of said modes said address counting means and said encoder are interconnected with said arithmetic unit, said storing means, and said translator to modify coded signal samples in accordance with the time-reversed impulse response of the system and converted modified and coded samples into electrical signals.

4. The phase equalizing system in accordance with claim 3 in which said address counting means comprises a signal responsive counter, a count matching circuit, and a sample address counter, said matching circuit receiving inputs from both of the aforementioned counters, a gate connected to the input of said signal responsive counter, means applying a start pulse to said mode controlling means for coupling clock impulses to said gate to initiate said first mode, means applying input signals from said amplifier to actuate said gate for gating clock impulses to the input of said signal responsive counter, said matching circuit actuating said sampler in response to the coincidence of identical counts in the outputs of said signal responsive counter and said sample address counter, means advancing said sample address counter in response to a predetermined count condition in said signal responsive counter, means responsive to a maximum output from said encoder for inhibiting the advance of said sample address counter, and further means responsive to such maximum coder output reducing the gain of said amplifier.

5. The phase equalizing system in accordance with claim 4 which further includes means responsive to a maximum count output of said sample address counter actuating said mode controlling means to indicate completion of said first mode of operation.

6. The phase equalizing system in accordance with claim 3 in which said address counting means comprises a signal responsive counter, a sample address counter, a matching circuit receiving input signals from said signal responsive and sample address counters, a gate responsive to signals in the output of said amplifier coupling clock voltage to said signal responsive counter, and means actuating said sampler in response to the occurrence of a matched condition between the outputs of said counters.

7. The equalizing system in accordance with claim 6 in which said storing means has a capacity of $n$ binary words of $m$ bits each, means apply to said amplifier standard signal samples including typical phase distortion for said transmission medium, an accumulator in said arithmetic unit totals the magnitudes represented by a predetermined number $j$ of binary words in the output of said encoder, means responsive to the accumulation of said $j$ sample magnitudes shift binary digits representing the average of said $j$ magnitudes from said accumulator to said storing means, and means responsive to said shift advance said sample address counter.

8. The automatic equalizing system in accordance with claim 7 in which said accmulator comprises a first shift register and an add-subtract circuit connected in a series accumulator loop, said add-subtract circuit having first and second input connections for receiving minuend and subtrahend digits, respectively, for subtractions and for receiving augend and addend digits for additions, a second shift register coupling binary words from the output of said cooler to said accumulator, means comparing the magnitudes of each of said coupled words with the total in said accumulator loop on a bit-by-bit basis, gating means in said loop responsive to the output of said magnitude comparator for coupling the larger of the coupled and accumulated words to said first input of said add-subtract circuits, and means coupling the output of one stage of said first register to said storing means.

9. The automatic phase equalizing system in accordance with claim 7 which comprises means responsive to a full count in said address counter actuating said mode controlling means to indicate completion of said second mode of operation.

10. The automatic phase equalizing system in accordance with claim 7 in which said storing means comprises a recirculating signal translation loop including an untapped delay means having a capacity at least equal to the number of digits in all of the binary coded impulse response samples, logical circuit means regenerating digits in the output of said delay means and applying the regenerated digits to the input of said delay means, and said logical circuit means also includes means writing digits in said loop during said second mode, and means nondestructively reading out the content of said loop to said arithmetic unit during said third mode.

11. The automatic phase equalizing system in accordance with claim 3 in which said arithmetic means comprises a binary digital multiplier, said storing means has a storage capacity of $n$ binary words of $m$ bits each, each encoded signal sample magnitude is in the form of an $m$-bit binary word, means applying the bits of each coded sample magnitude word in parallel from said encoder to $m$ inputs of said multiplier, means serially applying in time-reversed sequence said stored binary words to all of the parallel inputs of said multiplier whereby each coded signal sample magnitude is multiplied by all of said stored words, means accumulating sample products from said multiplier on a word-by-word basis with a one-word precession of the product words of one sample with respect to the product words of the next sample, a decoder converting binary coded magnitude words into phase-equalized analog signals, and means coupling accumulated binary words from said accumulator to said decoder at the signal sampling rate.

12. The phase equalizing system in accordance with claim 11 in which said multiplier comprises $m-2$ full adders, one half adder, coincidence gates coupling $m-1$ respective magnitude digits of each coded signal sample to an input of a different one of said adders, the most significant digit being coupled to said half adder, means serially applying each bit of one of said stored response words to all of said gates in multiple, a carry feedback loop from the carry output of each of said adders to another input of the same adder, each of said carry feedback circuits including a one-digit delay, and means shifting the sum output of each of said adders except the one receiving the least significant sample digit to a third input of the adder in the next less significant digit position after a one-digit delay, and in which said arithmetic means further includes means completing the final carry assimilation step of each response word multiplication, the last-mentioned means comprising a product shift register, a carry shift register, means actuatable after the multiplication of all magnitude digits in each response word coupling to the stages of said product register the sum outputs of all of said adders except said one adder and coupling the carry outputs of all of said adders to the stages of said carry register, and a serial adder combining on a bit-by-bit basis the serial outputs of said product and carry registers.

13. The automatic equalizing system in accordance with claim 11 in which said accumulating means comprises a shift register, add-subtract circuit means, and delay means connect in series in a closed loop with said register and said add-subtract circuit, means comparing the magnitudes of the accumulated total in said register with the output of said multiplier, and means responsive to the output of said comparator coupling such compared magnitudes to different inputs of said add-subtract circuit means.

14. The automatic phase equalizing system in accordance with claim 12 in which said accumulator comprises logic means comparing the magnitudes of each binary word produced by said serial adder and the binary word in said accumulator on a digit-by-digit basis, two accumulator delay loops are provided and each loop has a total capacity equal to $n+1$ words, a third shift register and an add-subtract circuit in a first one of said delay loops, a second add-subtract circuit in a second one of said delay loops, means coupling the carry output of said first add-subtract circuit to an input of said second add-subtract circuit, and means responsive to the outputs of both of said add-subract circuits translating accumulated product words into analog signals.

15. An automatic phase equalizer for digital systems comprising a signal path, means adjusting the magnitude of signals in said path, means in said signal path deriving from each signal impulse at least one multiple-digit binary word representing the magnitude of said impulse, storage means for binary coded magnitude information, an arithmetic unit including shift register means, word comparator means, a multiplier, and delay means, first control circuit means connecting the output of said deriving means to actuate said adjusting means for bringing the signal magnitude within the operating range of said deriving means, second control circuit means responsive to completion of said signal magnitude adjustment to disable said first control circuit means, said second control circuit means also connecting said register means and said comparator means in an accumulator loop to receive the output of said deriving means, said second control circuit means also coupling a portion of the content of said register to said store means after every $j$th signal, third control circuit means responsive to storage of a predetermined number of binary words for disabling said second control circuit means, said third control circuit means also connecting said multiplier to receive as multiplicand and multiplier the deriving means output and the storage means output, said third control circuit means further connecting said register means to receive the output of said multiplier and to connect said comparator and delay means in an accumulator loop to receive and total the output of said register means, means sampling the output of said accumulator loop at the signal impulse rate, and a translator converting such accumulator samples into analog electrical signals.

16. A digital equalizer comprising means sampling an electrical signal at a predetermined rate, means encoding in a binary code the magnitudes of signal samples in the output of said sampling means, means modifying said binary coded sample magnitudes in accordance with the time-reversed impulse response of a transmission medium being equalized, means combining the modified, coded, sample magnitudes on a real-time basis, and means translating samples of the output of said combining means into analog signals.

17. An automatic phase equalizing circuit for impulse transmission systems which comprises means obtaining plural samples of each impulse, an encoder translating the magnitudes of said samples into a corresponding plurality of binary words, means storing plural binary words which are characteristic of the typical impulse phase response of said system, an arithmetic unit first multiplying each encoded sample magnitude by said stored impulse response words and then accumulating on a real-time basis the products in the output of said multiplier, and means converting accumulated binary code word products into phase equalized impulses.

18. An automatic phase equalizing circuit comprising means obtaining a binary coded magnitude of a signal impulse, means storing binary coded words representing the typical impulse response of a transmission system to be equalized, a real-time arithmetic unit operating on each of said coded magnitudes with said coded words to produce a single coded binary word representing an impulse magnitude, and means converting said single word into an analog impulse.

19. An automatic digital equalizer comprising means sampling analog electrical signals at a predetermined rate, means encoding signal sample magnitudes in a multidigit binary code, means modifying each encoded sample magnitude in accordance with the time-reversed impulse response of the transmission medium being equalized, an accumulator totaling modified encoded sample magnitude portions overlapping one another in point of time, and means deriving an accumulated total from said accumulator once for each input signal sample.

20. An automatic digital equalizer comprising means sampling analog electrical signals at a predetermined rate, means encoding signal sample amplitudes in a multidigit binary code, means modifying each encoded sample amplitude in accordance with the time-reversed impulse response of the transmission medium being equalized, an accumulator totaling modified encoded sample magnitude portions overlapping one another in point of time, means deriving an accumulated total from said accumulator once for each input signal sample, a binary analog translator converting said totals into an electrical signal, and means responsive to the full loading of said translator reducing the amplitude of input signals to said sampler.

21. An automatic phase equalizing circuit for a digital transmission system comprising means obtaining a train of electric pulses representing in binary coded form the magnitudes of samplest of signals received from said system, means storing in serial order a plurality of binary coded words representing in time-reversed form the typical impulse response of said system, a real-time arithmetic unit operating on each of said coded magnitudes with all of said coded words in said time-reversed sequence to produce a single coded binary word representing the magnitude of a phase-equalized impulse, and means converting said single word into an analog signal.

22. Apparatus for phase equalizing a transmission medium comprising means sampling and encoding in binary digital form the communication signals passed through said transmission medium, means storing serially $n$ multidigit binary words representing sample magnitudes of the impulse response of said medium, means applying all of said response samples serially to each of the communication signal samples as multiplying factors, accumulator means having a plurality of storage positions, means storing the products of said response samples and communication signal samples in successive storage positions of said accumulator means, said storage positions exceeding by one the number of response words so that there is a precession of said accumulator positions with respect to the multiplier product words at the signal sampling rate, decoding means, and means for delivering the instantaneous sum of the products accumulated in any one of said storage positions to said decoding means whenever said storage position receives the product of the $n$th response sample and a communication signal sample, whereby said decoder produces a sequence of signals which is representative of said communication signals in phase corrected form.

23. An automatic digital equalizer for correcting delay distortion in electrical signals, said equalizer comprising a signal amplifier, means encoding in a multidigit binary code, the magnitudes of samples of signals in the output of said amplifier, means storing the impulse response of a transmission system to be equalized, said storing means comprising an untapped delay loop, an arithmetic unit modifying said encoded sample magnitudes in accordance with the impulse response from said storing means, timing means operating said sampler at a predetermined rate and circulating said impulse response words around said loop with a circulation rate equal to the rate of occurrence of said signal samples, said timing means also operating said arithmetic unit at the word rate of impulse response words in said loop, and means responsive to said timing means reading the output of said arithmetic unit at the circulation rate of said loop.

24. An automatic digital equalizer for correcting delay distortion in a transmission medium, said equalizer comprising means storing a plurality of multidigit binary words representing samples of the impulse response of said medium, means deriving multidigit binary word representations of samples of signals received from said medium, a real-time multiplier comprising means applying each of said binary signal sample representations in parallel form to the input of said multiplier at the sampling rate, means applying all of said impulse response words to the input of said multiplier in serial form at $n \cdot m$ times the sampling rate where $n$ is the number of $m$-bit words in said storing means, means in said multiplier combining said signal sample words and said response sample words, means extracting products from said multiplier at the rate of $n$ times the sampling rate, an accumulator having $n+1$ word storage positions totaling the product words from said multiplier, and means reading out the accumulated total from a word position in said accumulator at the rate of occurrence of said signal samples.

25. In a phase-equalized transmission system, a source of signals, a digital equalizer for correcting phase distortion, a transmission medium coupling signals from said source to said equalizer, means in said source applying Standard pulses to said medium, the configuration of said pulses at the output of said medium comprising the impulse response of said medium, said equalizer comprising a signal sampler, response address means actuating said sampler at certain predetermined locations in said impulse response, means adjusting the magnitudes of pulses received from said medium, means measuring each sample magnitude in the output of said sampler at a predetermined impulse response location, means responsive to a predetermined output level from said measuring means automatically operating said adjusting means to reduce the magnitudes of said standard pulses, means responsive to a standard pulse magnitude less than said level actuating said response address means to initiate measurements at a new impulse response location in each standard pulse sample, an accumulator, means responsive to said response address means upon completion of the automatic magnitude adjustment at all of said predetermined impulse response locations coupling the output of said measuring means to said accumulator, storing means, means responsive to the accumulation of $j$ sample magnitudes at each said impulse response location coupling the average value of the $j$ sample magnitudes to said storing means, means responsive to the completion of the storing of said average actuating said response address means to operate said sampler at a new impulse response location, means responsive to said response address means upon completion of the storing of said averages at all of said predetermined impulse response locations and actuating said signal source to apply information signals to said medium in lieu of said standard pulses, loop store address means, further means responsive to the completion of all of said storing operations coupling said loop address means to actuate said sampler in a cyclic manner at a predetermined rate, means modifying each information signal sample magnitude in accordance with all impulse response sample magnitudes in a time-reversed manner, means in said accumulator receiving the modified signal sample magnitudes and totaling such magnitudes on a real-time basis, and means reading out accumulated totals in said accumulator at the sampling rate.

26. A digital, automatic, phase equalizer comprising means sampling received signals, an encoder converting the magnitudes of signal samples to words in a multidigit binary code, means storing a plurality of multi-digit binary words representing sample magnitudes of the impulse response of a system to be equalized, an arithmetic unit modifying each coded signal sample magnitude in accordance with the coded words in said storing means and in accordance with modified response portions of adjacent signal samples overlapping such sample in point of time, and means translating modified sample code words in the output of said arithmetic unit into corresponding electrical analog signals.

27. A digital, phase equalizer comprising means sampling electric signals, an encoder representing signal sample magnitudes in multidigit binary code words, means storing in the form of $n$ multidigit binary coded words the impulse response of a transmission medium to be equalized, an arithmetic unit comprising magnitude comparing means, an add-subtract logic circuit, an entry shift register shifting binary coded digits to said comparator, a storage shift register, first connecting means coupling said entry register to receive coded magnitude words from said coder and also coupling said storage register in a closed loop with said add-subtract circuit and part of said comparator to form an accumulator loop capable of totaling $j$ sample magnitude codes for determining system impulse response, said first connecting means also coupling a portion of the total of said $j$ codes to said storing means, a multiplier receiving said coded signals and receiving said impulse response signals in a time-reversed manner, means connecting said entry and storage registers to couple the output of said multiplier to an input of said comparator, delay means, second connecting means coupling said delay means and said add-subtract circuit in an accumulator loop with a part of said magnitude comparator, the last-mentioned accumulator loop having a storage capacity of $n+1$ accumulated magnitude words where $n$ is the word storage capacity of said response store, means selectively actuating either said first or said second connecting means, and a translator converting binary coded totals in said last-mentioned accumulator loop into analog electrical signals.

28. The digital equalizer in accordance with claim 27 in which said delay means and said last-mentioned accumulator loop comprise a first magnetostrictive delay line connected in a series loop with said comparator and said add-subtract circuit, a second add-subtract circuit receiving the carry output of said first add-subtract circuit, and a second magnetostrictive delay line connected in a closed loop with said second add-subtract circuit.

29. A digital equalizer for correcting delay distortion in electric signals and comprising means sampling electrical signals of either positive or negative polarity, an encoder producing a multidigit binary word representing in binary code form both the magnitude and the polarity of each signal sample, means storing the impulse response of a transmission medium which is to be equalized, means operating on the digits of said coded signal sample magnitude with the stored impulse response of said medium for correcting each signal sample magnitude for both system impulse response and real-time overlap with portions of adjacent modified signal samples, means responsive to the coded signal polarity information controlling the operation of said correcting means, and translating means converting corrected sample magnitude codes into analog electrical signals.

30. The digital equalizer in accordance with claim 29 in which said correcting means comprises an arithmetic unit including a multiplier operating on each set of coded sample magnitude digits with all stored response magnitude digits, an accumulator totaling product words generated by said multiplier, and a sign digit comparator controlling adding and subtracting operations in said accumulator in response to polarity information in the output of said encoder and in said accumulator.

31. An automatic digital equalizer for phase distorted electrical signals, said equalizer comprising means applying to said equalizer a train of pulses containing typical delay distortion for a transmission system which is to be equalized, means encoding in a multidigit binary code the magnitudes of samples of said pulses, storage means, control means shifting coded signal sample information from a first predetermined group of said pulses into said storage means in time-reversed order, an arithmetic unit responsive to encoded signal samples from a second portion of said pulses and to said stored and time-reversed samples correcting said second portion of coded samples for delay distortion, and means translating corrected coded samples into analog electrical signals.

32. A digital equalizer in accordance with claim 31 in which said control means includes a source of clock signals and sample address means responsive to said clock signals actuating said encoding means to sample predetermined discrete locations in each pulse of said first group.

33. A digital equalizer in accordance with claim 32 in which said control means includes means repeatedly actuating said encoding means at each of said locations for $j$ pulses, and means in said arithmetic unit averaging the $j$ sample magnitudes, and said control means shifts the average value of said $j$ magnitudes into said storing means.

34. An automatic digital equalizer for correcting delay distortion in electrical signals and for operating independently of any synchronizing characteristics of said signals, said equalizer comprising a sampler, control means actuating said sampler at a rate which is at least equal to twice the bandwidth of the signals to be equalized, a coder translating sampler analog output pulse magnitudes into a binary coded form, means storing in a similar binary coded form plural digital words representing sample magnitudes of the impulse response for the system being equalized, an arithmetic unit modifying each of the encoded signal samples in accordance with all of said stored impulse response words, said arithmetic unit including an accumulator totaling with all modified sample products all time-overlapping sample products of adjacent modified signal samples, means reading out said accumulator at the sampler actuation rate, and means translating the accumulator readout to an analog signal.

35. A digital, automatic phase equalizer comprising a signal sampler, a coder producing an $m$-bit binary word representing the magnitude of each sample, means storing $n$ binary words representing the impulse response of a system which is to be equalized, each of said response words also including $m$ bits, an arithmetic unit modifying coded signal samples in accordance with said impulse response, said unit comprising a multiplier including a plurality of stages each having a logical adder receiving at one input one magnitude bit of a signal sample word to be multiplied, means coupling the carry output of each adder to another one of its own inputs, means coupling the sum output of each adder to an input of the adder in the next less significant stage of said multiplier, first and second shift registers, and means coupling the sum outputs of all but the least significant stage and all of the carry outputs of said adders in parallel to said shift registers, respectively, a serial adder combining bit-by-bit the outputs of said registers, an accumulator in said arithmetic unit having $n+1$ word storage places and receiving the output of said serial adder, means reading out the accumulated total in a word position of said accumulator once for each signal sample encoded, and means translating said accumulator output word to an analog electrical signal.

36. An automatic digital equalizer for phase equalizing electrical signals and comprising means sampling an analog electrical signal at a predetermined rate, means translating the analog sample magnitudes in the output of said sampling means into an $m$-digit binary code word wherein $m-1$ digits represent sample magnitude and the $m$th digit represents the polarity of the sample, means storing the impulse response of a transmission medium to be equalized, means modifying coded sample magnitude representations in accordance with the time-reversed impulse response from said storing means, a magnitude comparator, means connecting said comparator in an accumulator loop, said comparator comprising a first input receiving the binary code representations of modified signal samples in serial form with the least significant digit first, a second input receiving binary code representations of information accumulated in said loop in serial form with the least significant digit first, first means indicating the presence of a ONE in one of said inputs in the absence of a ONE in the other of said inputs, second means indicating the presence in an accumulated word of a ONE in a digit position which is more significant than the position of any of the $(m-1)$ least significant digits, and means responsive to the outputs of said two indicating means activating one or the other of two magnitude comparator outputs to indicate either that the new signal sample word magnitude is larger than the accumulated word or that the accumulated word is at least equal to the new word, means reading out said accumulator loop at the sample rate, and means translating the accumulator output binary information into analog electrical signals.

37. An automatic digital equalizer comprising means sampling an analog electrical signal at a predetermined rate, means translating the analog sample magnitudes in the output of said sampling means into an $m$-digit binary code word where $m-1$ digits represent sample magnitude and the $m$th digit represents the polarity of the sample, means storing the impulse response of a transmission medium to be equalized, means modifying coded sample magnitude representations in accordance with the time-reversed impulse response from said storing means, an accumulator loop summing for each signal sampling time slot all modified sample portions overlapping said time slot, said loop comprising a magnitude comparator, add-subtract means, and delay means all connected in a closed loop, a sign digit comparator having a first input receiving the sign digit of each coded sample representation, a second input receiving the sign digit of each accumulated word, means indicating whether sign digits in said first and second inputs are similar or different, means responsive to the indication of similar or different sign digits controlling said add-subtract means, means responsive to an indication of different signs coincident with a predetermined magnitude comparator output injecting in the output of said add-subtract circuit a binary digit corresponding to the sign of the larger one of the coded and modified sample representations or said accumulated word, means reading out one word position from said accumulator loop at the sampling rate, and means translating the accumulator output into analog signals.

38. In a digital equalizer for a transmission system having a certain impulse response for a given standard impulse, means sampling received signals at a predetermined rate such that $i$ successive samples are taken during each time interval of duration equal to said impulse response, means encoding said samples, means modifying encoded samples in accordance with the time-reversed impulse response of said system, and means responsive to the modified encoded samples synthesizing an equalized analog signal, the improvement which comprises means applying to said sampler standard pulses with typical system delay distortion corresponding to said impulse response, a digital accumulator totaling the magnitudes of $j$ samples of said standard distorted pulses at each of $i$ sample locations in said impulse response, means deriving from said accumulator the average value of said $j$ samples for each of said locations, and means storing the average sample magnitude for each of the $i$ impulse response locations.

39. The digital equalizer in accordance with claim 38 which comprises in addition address control means responsive to the initiation of an input pulse to said equalizer actuating said sampler at predetermined impulse response locations $i$, pulse gating means producing a first burst of control pulses in response to each sampling means actuating pulse, said first burst controlling the operation of said accumulator for totaling each coded sample magnitude into said accumulator, means responsive to the $j$th sampling means actuation pulse advancing said address control means and also producing a second burst of control pulses subsequent to said first burst for said $j$th sample, and connections applying said second burst to actuate said deriving means and said storing means.

40. A digital equalizer comprising a signal sampler, a sample magitude encoder translating signal sample magnitudes into a multidigit binary code, an arithmetic unit including multiplier means, accumulator means, and averaging means, means for storing a plurality of binary coded magnitude words, a source of clock pulses, clock pulse counting means, a first set of output connections from said counting means, a second set of output connections from said counting means, said second set being the binary ones complements of said first set, means connected to said first set of outputs interconnecting said accumulator and averaging means with said encoder for determining the average magnitude of signal pulse samples at each of a plurality of predetermined locations in said pulse, further means connected to said first set of outputs storing said average magnitudes in said storing means, and means connected to said second set of outputs interconnecting said multiplier and accumulator means with said storing means and encoding means for multiplying each encoded signal sample magnitude by all of said averages and accumulating the resulting products on a real-time basis, and means translating the digital output of said accumulator into analog electrical signals.

References Cited in the file of this patent

UNITED STATES PATENTS

| | | |
|---|---|---|
| 2,908,873 | Bogert | Oct. 13, 1959 |
| 2,908,874 | Pierce | Oct. 13, 1959 |